United States Patent
Leung et al.

(10) Patent No.: US 9,007,914 B2
(45) Date of Patent: Apr. 14, 2015

(54) METHODS AND APPARATUS FOR ENABLING RATE ADAPTATION ACROSS NETWORK CONFIGURATIONS

(75) Inventors: Nikolai Konrad Nepomucceno Leung, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 12/893,980

(22) Filed: Sep. 29, 2010

(65) Prior Publication Data

US 2011/0075563 A1    Mar. 31, 2011

Related U.S. Application Data

(60) Provisional application No. 61/247,095, filed on Sep. 30, 2009.

(51) Int. Cl.
| | | |
|---|---|---|
| H04L 12/26 | (2006.01) | |
| H04W 28/12 | (2009.01) | |
| H04L 12/825 | (2013.01) | |
| H04L 12/801 | (2013.01) | |
| H04L 12/66 | (2006.01) | |
| H04W 88/16 | (2009.01) | |

(52) U.S. Cl.
CPC ............. *H04W 28/12* (2013.01); *H04L 47/263* (2013.01); *H04W 88/16* (2013.01); *H04L 47/14* (2013.01); *H04L 12/66* (2013.01)

(58) Field of Classification Search
None
See application file for complete search history.

(56) References Cited

U.S. PATENT DOCUMENTS

| 5,633,859 | A | 5/1997 | Jain et al. |
| 6,535,482 | B1 * | 3/2003 | Hadi Salim et al. ......... 370/229 |
| 6,741,555 | B1 * | 5/2004 | Li et al. ........................ 370/229 |
| 6,839,321 | B1 * | 1/2005 | Chiruvolu ................. 370/230.1 |
| 6,876,639 | B1 * | 4/2005 | Cao .................................. 370/331 |
| 8,081,566 | B1 | 12/2011 | Ashwood-Smith et al. |
| 2002/0150060 | A1 * | 10/2002 | Montpetit ..................... 370/316 |
| 2002/0194361 | A1 * | 12/2002 | Itoh et al. ..................... 709/233 |

(Continued)

FOREIGN PATENT DOCUMENTS

| EP | 1217804 A2 | 6/2002 |
| JP | H09247174 A | 9/1997 |

(Continued)

OTHER PUBLICATIONS

"3rd Generation Partnership Project; Technical Specification Group Services and System Aspects; Enabling Coder Selection and Rate Adaptation for UTRAN and E-UTRAN for Load Adaptive Applications; Stage 2 (Release 10)".3GPP Standard; 3GPP TR 23.860, 3rd Generation Partnership Project (3GPP),Mobile Competence Centre ; 650, Route Des Lucioles ; F-06921 Sophia-Antipolis Cedex France No. V2.0.0, Jun. 14, 2010,pp. 1-14, XP050441624, [retrieved on Jun. 14, 2010] p. 7-p. 8 p. 10-p. 11.

(Continued)

*Primary Examiner* — Otis L Thompson, Jr.
(74) *Attorney, Agent, or Firm* — Michael J. DeHaemer, Jr.

(57) ABSTRACT

Systems and methods for implementing explicit congestion notification (ECN) across disparate networks, configurations, and protocols are disclosed. Local rate adaptation using ECN may be provided without relying on other operators to upgrade or ensure their networks are ECN transparent or ECN capable.

27 Claims, 14 Drawing Sheets

(56) References Cited

U.S. PATENT DOCUMENTS

| | | | |
|---|---|---|---|
| 2003/0018794 A1* | 1/2003 | Zhang et al. | 709/231 |
| 2003/0123455 A1* | 7/2003 | Zhao et al. | 370/398 |
| 2003/0139145 A1 | 7/2003 | Lee et al. | |
| 2004/0052212 A1* | 3/2004 | Baillargeon | 370/235 |
| 2004/0081092 A1* | 4/2004 | Rhee et al. | 370/230 |
| 2004/0148423 A1* | 7/2004 | Key et al. | 709/235 |
| 2004/0196785 A1* | 10/2004 | Janakiraman et al. | 370/229 |
| 2006/0092836 A1* | 5/2006 | Kwan et al. | 370/229 |
| 2006/0193261 A1* | 8/2006 | Sethi | 370/236 |
| 2006/0250953 A1* | 11/2006 | Mooney et al. | 370/229 |
| 2006/0251050 A1* | 11/2006 | Karlsson | 370/352 |
| 2007/0028003 A1* | 2/2007 | Rudkin | 709/241 |
| 2008/0198746 A1 | 8/2008 | Kwan et al. | |
| 2008/0267070 A1* | 10/2008 | Mannal et al. | 370/235 |
| 2009/0054102 A1 | 2/2009 | Jung | |
| 2009/0285099 A1* | 11/2009 | Kahn et al. | 370/236 |
| 2010/0027547 A1 | 2/2010 | Shinozaki | |
| 2010/0195521 A1 | 8/2010 | Wanstedt et al. | |
| 2010/0246400 A1* | 9/2010 | Onishi et al. | 370/235 |
| 2010/0254262 A1* | 10/2010 | Kantawala et al. | 370/232 |
| 2010/0274871 A1* | 10/2010 | Harrang et al. | 709/217 |
| 2010/0309788 A1 | 12/2010 | Ho et al. | |
| 2011/0002224 A1* | 1/2011 | Tamura | 370/236 |
| 2011/0016209 A1* | 1/2011 | Moncaster et al. | 709/224 |
| 2011/0032935 A1* | 2/2011 | Yang | 370/389 |
| 2011/0128967 A1 | 6/2011 | Belling | |
| 2011/0170410 A1 | 7/2011 | Zhao et al. | |
| 2011/0202622 A1* | 8/2011 | Cadiou et al. | 709/206 |
| 2012/0051216 A1* | 3/2012 | Zhang et al. | 370/230 |
| 2012/0087244 A1 | 4/2012 | Leung | |
| 2012/0087245 A1 | 4/2012 | Leung | |

FOREIGN PATENT DOCUMENTS

| | | |
|---|---|---|
| JP | H11150534 A | 6/1999 |
| JP | 2004015761 A | 1/2004 |
| JP | 2011503994 A | 1/2011 |
| WO | WO2006085184 A1 | 8/2006 |
| WO | WO-2008149434 A1 | 12/2008 |
| WO | WO-2009056968 A2 | 5/2009 |
| WO | WO2009090160 A1 | 7/2009 |
| WO | WO-2011055721 A1 | 5/2011 |

OTHER PUBLICATIONS

"3rd Generation Partnership Project; Technical Specification Group Services and System Aspects; IP Multimedia Subsystem (IMS); Multimedia Telephony; Media handling and interaction (Release 9)", 3GPP Standard; 3GPP TS 26.114, 3rd Generation Partnership Project (3GPP), Mobile Competence Centre ; 650, Route Des Lucioles ; F-06921 Sophia-Antipolis Cedex ; France, No. V9.3.0, Jun. 9, 2010, pp. 1-215, XP050441542, [retrieved on Jun. 9, 2010] section 6.1; p. 21 p. 68.

International Search Report and Written Opinion—PCT/US2010/050874—ISA/EPO—Jun. 15, 2011.

Ramakrishnan, K. et al., "The Addition of Explicit Congestion Notification (ECN) to IP", Network Working Group, Standards Track, RFC 3168, pp. 1-63, The Internet Society, Sep. 2001.

Westerlund, et al., "Explicit Congestion Notification (ECN) for RTP over UDP, draft-ietf-avt-ecn-for-rtp-02.txt", Internet Engineering Task Force (IETF), standardworkingdraft, Internet Society (ISOC) 4, Rue Des Falaises CG-1205 Geneva, Switzerland, No. 2, Jul. 10, 2010, pp. 1-47, XP015069884, [retrieved on Jul. 10, 2010].

European Search Report—EP13000236—Search Authority—Munich—Feb. 5, 2013.

European Telecommunications Standards Institute; Universal Mobile Telecommunications System (UMTS): LTE: IP Multimedia Subsystem (IMS): Multimedia Telephony: Media Handling and Interaction 3GPP TS 26.114 version 9.3.0 Release 9 (Jun. 9, 2010) pp. 1-217.

Taiwan Search Report—TW099133339—TIPO—Jun. 25, 2013.

\* cited by examiner

METHODS AND APPARATUS FOR ENABLING RATE ADAPTATION ACROSS NETWORK CONFIGURATIONS

CROSS-REFERENCE TO RELATED APPLICATIONS

This application claims priority under 35 U.S.C. §119(e) to U.S. Provisional Patent Application Ser. No. 61/247,095 entitled METHODS FOR ENABLING RATE ADAPTATION ACROSS VARIOUS NETWORK CONFIGURATIONS, filed on Sep. 30, 2009, the content of which is hereby incorporated by reference herein in its entirety for all purposes.

FIELD

This application is directed generally to wireless communications systems. More particularly, but not exclusively, the application relates to methods and apparatus for providing explicit congestion notification (ECN) functionality across disparate networks, configurations, and/or protocols.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs)). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into NS independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Base station nodes, sometimes referred to as eNBs, have different capabilities for deployment in a network. This includes transmission power classes, access restriction, and so forth. In one aspect, heterogeneous network characteristics create wireless coverage dead spots (e.g., Donut coverage hole). This may cause severe inter-cell interference requiring undesirable user equipment cell association. In general, heterogeneous network characteristics require deep penetration of physical channels which may cause unwanted interference between nodes and equipment on the respective network.

Explicit Congestion Notification (ECN) is an extension to the Internet Protocol (IP) and to the Transmission Control Protocol (TCP) and is defined in RFC 3168 (2001). ECN allows end-to-end notification of network congestion dropping packets, and is an optional feature that is only used when both endpoints support it and are willing to use it. ECN is only effective when supported by the underlying network. Traditionally, TCP/IP networks signal congestion by dropping packets. However, when ECN is successfully negotiated, an ECN-aware router may set a mark in the IP header instead of dropping a packet in order to signal impending congestion. The receiver of the packet echoes the congestion indication to the sender, which must react as though a packet was dropped. Some outdated or buggy network equipment may drop packets with ECN bits set, rather than ignoring the bits.

ECN functionality can be used to perform end-to-end rate adaptation between user equipment or devices (UEs) in a wireless network. However, if the transport network does not properly support ECN, the terminals will have to disable ECN and the UEs cannot perform rate adaptation. Even if an operator ensures that its network properly supports ECN, it cannot guarantee that another operator will do the same for their network. As a result, calls between UEs in different operator networks cannot be guaranteed to support rate adaptation using ECN.

One solution is to require that all operator networks and UEs support ECN. One problem with this approach is that it requires significant work for the operators to ensure that their network is ECN-transparent and not all operators are interested in this feature. Another solution is to have the UEs constantly probe the transport path to determine if it is ECN-transparent. If it is not, the UEs disable the ECN and rate adaptation function. Therefore this does not ensure ECN/rate adaptation for all calls, and has the additional complexity burden of requiring UEs to constantly probe and monitor the transport path

SUMMARY

This disclosure is directed generally to wireless communications systems and congestion management and mitigation through use of ECN and rate reduction functionality across multiple networks.

In one aspect, the disclosure relates to a method for providing communications. The method may include receiving, at an interworking gateway coupled between a first network and a second network, a first set of media generated at a first data rate, wherein the first set of media includes an indication of network congestion generated within the first network, and providing, in response to the indication, a data rate adjustment request for requesting a lower data rate from a first user equipment (UE) in the first network.

The method may further include receiving, at the interworking gateway, a second set of media sent from the first UE at a second data rate in response to the data rate adjustment request, and sending, from the interworking gateway to the second network, the second set of media. The first set of media and second set of media may be generated by the first UE in the first network for transmission to a second UE in the second network. The second set of media may be modified to remove ECN marking in the first network. The sending may include sending the modified media. The indication of congestion may include an explicit congestion indication congestion encountered (ECN-CE) marking or other marking, flagging, or bit setting consistent with an ECN protocol. The method may further include modifying the first set of media to remove the ECN-CE marking, and may also include sending the modified first set of media to the second network.

The first network may be an ECN capable network and the second network node may be a non-ECN capable network. The data rate adjustment request may comprise a Temporary Maximum Media Stream Bit Rate Request (TMMBR) or Codec Mode Request (CMR). The first network and the second network may be wireless communication networks. One or more of the first and second networks may be wired communication networks, in whole or in part.

In another aspect, the disclosure relates to a method for processing media at an interworking gateway. The method may include receiving, at the interworking gateway, which may be in communication with a first wireless network and a second wireless network, a media data packet transmitted by a UE within the first wireless network. The media data packet may be ECN marked. The method may further include processing the data packet to remove ECN marking, and sending the processed data packet to the second network.

In another aspect, the disclosure relates to a method for providing communications. The method may include sending a first set of media, from a UE in a first network to a UE in a second network, receiving, in response to the sending a first set of media, a data rate adjustment request from an interworking gateway, and sending, in response to the data rate adjustment request, a second set of media to the UE in the second network at an adjusted rate. The data rate adjustment request may comprise a TMMBR or CMR.

In another aspect, the disclosure relates to a method for providing communications at an interworking gateway. The method may include receiving, from a first UE in a first network, a data rate adjustment request, wherein the data rate adjustment request is provided from the first UE in response to receipt of a congestion indication in media provided from a second UE in a second network, and processing the rate adjustment request so as to provide integration of ECN functionality between the first and second networks.

The processing the rate adjustment request may include forwarding data rate adjustment information to the second UE if the interworking gateway determines that the second UE can support an adjusted data rate consistent with the data rate adjustment request. The interworking gateway may determine that the second UE can support an adjusted data rate during a negotiation session between the interworking gateway and the second UE. The processing the rate adjustment request may include transcoding media received from the second UE consistent with the data rate reduction request. The transcoding may include lowering the media data rate of the media received from the second UE so as to mitigate congestion in the first network.

The interworking gateway may process the media from the second network to make it ECN capable. For example, the received media may be marked consistent with an ECN protocol. The marking may be ECT marking. The marked media may be provided to the first network, where it may be delivered to the first UE.

The disclosure further relates to computer program products, devices, apparatus, and systems for implementing the above-described methods, as well as other methods and processed described herein. Various additional aspects are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
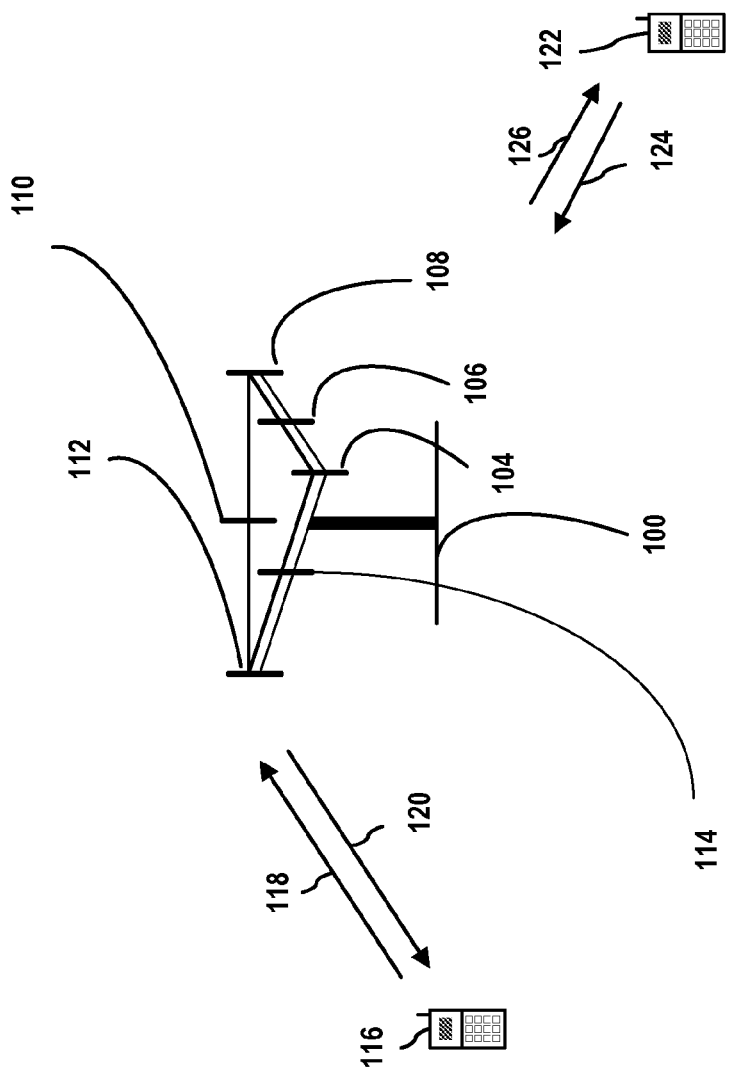
FIG. 1 illustrates details of a wireless communications system.

This disclosure relates generally to systems and methods for congestion management and mitigation in wireless communications systems, which may facilitate interworking based on ECN functionality across disparate networks, configurations, and/or protocols. As described herein, a network that supports ECN functionality is said to be ECN Transport Capable (ECT), and may also be described herein as being ECN capable, ECN transparent and/or ECN compliant. Likewise, a network that does not support ECN functionality may be referred to as non-ECN compliant or non-ECN capable or transparent.

In one aspect, the disclosure relates to a method for providing communications. The method may include receiving, at an interworking gateway coupled between a first network and a second network, a first set of media generated at a first data rate, wherein the first set of media includes an indication of network congestion generated within the first network, and providing, in response to the indication, a data rate adjustment request for requesting a lower data rate from a first user equipment (UE) in the first network.

The method may further include receiving, at the interworking gateway, a second set of media sent from the first UE at a second date rate in response to the data rate adjustment request, and sending, from the interworking gateway to the second network, the second set of media. The first set of media and second set of media may be generated by the first UE in the first network for transmission to a second UE in the second network. The second set of media may be modified to remove ECN marking in the first network. The sending may include sending the modified media. The indication of congestion may include an explicit congestion indication congestion encountered (ECN-CE) marking or other marking, flagging, or bit setting consistent with an ECN protocol. The method may further include modifying the first set of media to remove the ECN-CE marking, and may also include sending the modified first set of media to the second network.

The first network may be an ECN capable network and the second network node may be a non-ECN capable network. The data rate adjustment request may comprise a Temporary Maximum Media Stream Bit Rate Request (TMMBR) or Codec Mode Request (CMR). The first network and the second network may be wireless communication networks. One or more of the first and second networks may be wired communication networks, in whole or in part.

In another aspect, the disclosure relates to a computer program product. The computer program product may include a computer-readable medium having codes for causing a computer to receive a first set of media generated at a first data rate, wherein the first set of media includes an indication of network congestion generated within the first network. The codes may further include codes for causing the computer to provide, in response to the indication, a data rate adjustment request for requesting a lower data rate from a first UE in a first network.

In another aspect, the disclosure relates to an interworking gateway. The interworking gateway may include a first network interface module configured to receiving a first set of media generated at a first data rate from a first network, wherein the first set of media includes an indication of network congestion generated within the first network, and provide, in response to the indication, a data rate adjustment request for requesting a lower data rate to a first UE in the first network. The first network interface module may be further configured to receive a second set of media sent from the first UE at a second date rate in response to the data rate adjustment request. The gateway may further include a second network interface module configured to send, to a second network, the second set of media.

The first set of media and second set of media may be generated by the first UE in the first network for transmission to a second UE in the second network. The gateway may further including a processor module configured to remove ECN marking from the second set of media to generate modified media. The sending may include sending the modified media.

The indication of congestion may comprise an explicit congestion indication congestion encountered (ECN-CE) marking. The gateway may further include a processor module configured to modify the first set of media to remove the ECN-CE marking. The gateway may further include a second network interface module configured to send the modified first set of media to the second network. The first network may be an ECN capable network and the second network may be a non-ECN capable network. The gateway may further include a processor module configured to generate the data rate adjustment request as a TMMBR or CMR. The first network and the second network may be wireless communication networks. The first network and/or the second network may be wired communication networks.

In another aspect, the disclosure relates to an interworking gateway. The interworking gateway may include means for receiving a first set of media generated at a first data rate, wherein the first set of media includes an indication of network congestion generated within the first network. The gateway may further include means for providing, in response to the indication, a data rate adjustment request for requesting a lower data rate from a first UE in the first network.

In another aspect, the disclosure relates to a method for processing media at an interworking gateway. The method may include receiving, at the interworking gateway, which may be in communication with a first wireless network and a second wireless network, a media data packet transmitted by a UE within the first wireless network. The media data packet may be ECN marked. The method may further include processing the data packet to remove ECN marking, and sending the processed data packet to the second network.

In another aspect, the disclosure relates to a computer program product. The computer program product may include a computer-readable medium having codes for causing a computer to receive, at the interworking gateway, which may be in communication with a first wireless network and a second wireless network, a media data packet transmitted by a UE within the first wireless network. The media data packet may be ECN marked. The codes may further include codes for causing the computer to process the data packet to remove ECN marking, and send the processed data packet to the second network.

In another aspect, the disclosure relates to an interworking gateway. The interworking gateway may be in communication with a first wireless network and a second wireless network. The interworking gateway may be configured to receive a media data packet transmitted by a UE within the first wireless network. The media data packet may be ECN marked. The gateway may be further configured to process the data packet to remove ECN marking, and send the processed data packet to the second network.

In another aspect, the disclosure relates to an interworking gateway. The interworking gateway may be in communication with a first wireless network and a second wireless network. The interworking gateway may include means for receiving a media data packet transmitted by a UE within the first wireless network. The media data packet may be ECN marked. The gateway may further include means for processing the data packet to remove ECN marking, and means for sending the processed data packet to the second network.

In another aspect, the disclosure relates to a method for providing communications. The method may include sending a first set of media, from a UE in a first network, to a UE in a second network, receiving, in response to the sending a first set of media, a data rate adjustment request from an interworking gateway, and sending, in response to the data rate adjustment request, a second set of media to the UE in the second network at an adjusted rate. The data rate adjustment request may comprise a TMMBR or CMR.

In another aspect, the disclosure relates to a computer program product. The computer program product may include a computer-readable medium having codes for causing a computer to receive, in response to the sending a first set of media, a data rate adjustment request from an interworking gateway, and send in response to the data rate adjustment request, a second set of media to the UE in the second network at an adjusted rate. The data rate adjustment request may comprise a TMMBR or CMR.

In another aspect, the disclosure relates to a communications device. The communications device may include a transmitter module configured to send a first set of media to a UE in a second network, and a receiver module configured to receive, in response to the sending a first set of media, a data rate adjustment request from an interworking gateway. The transmitter module may be further configured to send, in response to the data rate adjustment request, a second set of media to the UE in the second network at an adjusted rate. The communications device may be terminal or UE.

In another aspect, the disclosure relates to a communications device. The communications device may include means for sending a first set of media to a UE in a second network, means for receiving, in response to the sending a first set of media, a data rate adjustment request from an interworking gateway, and means for sending, in response to the data rate adjustment request, a second set of media to the UE in the second network at an adjusted rate.

In another aspect, the disclosure relates to a method for providing communications at an interworking gateway. The method may include receiving, from a first UE in a first network, a data rate adjustment request, wherein the data rate adjustment request is provided from the first UE in response to receipt a congestion indication in media provided from a second UE in a second network, and processing the rate adjustment request so as to provide integration of ECN functionality between the first and second networks.

The processing the rate adjustment request may include forwarding data rate adjustment information to the second UE if the interworking gateway determines that the second UE can support an adjusted data rate consistent with the data rate adjustment request. The interworking gateway may determine that the second UE can support an adjusted data rate during a negotiation session between the interworking gateway and the second UE. The processing the rate adjustment request may include transcoding media received from the second UE consistent with the data rate reduction request. The transcoding may include lowering the media data rate of the media received from the second UE so as to mitigate congestion in the first network.

In another aspect, the disclosure relates to a computer program product. The computer progr In one aspect, the disclosure relates to a method for providing communications. The method may include receiving, at an interworking gateway coupled between a first network and a second network, a first set of media generated at a first data rate, wherein the first set of media includes an indication of network congestion generated within the first network, and providing, in response to the indication, a data rate adjustment request for requesting a lower data rate from a first user equipment (UE) in the first network.

The method may further include receiving, at the interworking gateway, a second set of media sent from the first UE at a second date rate in response to the data rate adjustment request, and sending, from the interworking gateway to the second network, the second set of media. The first set of media and second set of media may be generated by the first UE in the first network for transmission to a second UE in the second network. The second set of media may be modified to remove ECN marking in the first network. The sending may include sending the modified media. The indication of congestion may include an explicit congestion indication congestion encountered (ECN-CE) marking or other marking, flagging, or bit setting consistent with an ECN protocol. The method may further include modifying the first set of media to remove the ECN-CE marking, and may also include sending the modified first set of media to the second network.

The first network may be an ECN capable network and the second network node may be a non-ECN capable network. The data rate adjustment request may comprise a TMMBR or CMR. The first network and the second network may be wireless communication networks. One or more of the first and second networks may be wired communication networks, in whole or in part.

In another aspect, the disclosure relates to a computer program product. The computer program product may include a computer-readable medium having codes for causing a computer to receive a first set of media generated at a first data rate, wherein the first set of media includes an indication of network congestion generated within the first network. The codes may further include codes for causing the computer to provide, in response to the indication, a data rate adjustment request for requesting a lower data rate from a first UE in a first network.

In another aspect, the disclosure relates to an interworking gateway. The interworking gateway may include a first network interface module configured to receiving a first set of media generated at a first data rate from a first network, wherein the first set of media includes an indication of network congestion generated within the first network, and provide, in response to the indication, a data rate adjustment request for requesting a lower data rate to a first UE in the first network. The first network interface module may be further configured to receive a second set of media sent from the first UE at a second date rate in response to the data rate adjustment request. The gateway may further include a second network interface module configured to send, to a second network, the second set of media.

The first set of media and second set of media may be generated by the first UE in the first network for transmission to a second UE in the second network. The gateway may further including a processor module configured to remove ECN marking from the second set of media to generate modified media. The sending may include sending the modified media.

The indication of congestion may comprise an explicit congestion indication congestion encountered (ECN-CE) marking. The gateway may further include a processor module configured to modify the first set of media to remove the ECN-CE marking. The gateway may further include a second network interface module configured to send the modified first set of media to the second network. The first network may be an ECN capable network and the second network may be a non-ECN capable network. The gateway may further include a processor module configured to generate the data rate adjustment request as a TMMBR or CMR. The first network and the second network may be wireless communication networks. The first network and/or the second network may be wired communication networks.

In another aspect, the disclosure relates to an interworking gateway. The interworking gateway may include means for receiving a first set of media generated at a first data rate, wherein the first set of media includes an indication of network congestion generated within the first network. The gateway may further include means for providing, in response to the indication, a data rate adjustment request for requesting a lower data rate from a first UE in the first network.

In another aspect, the disclosure relates to a method for processing media at an interworking gateway. The method may include receiving, at the interworking gateway, which may be in communication with a first wireless network and a second wireless network, a media data packet transmitted by a UE within the first wireless network. The media data packet may be ECN marked. The method may further include processing the data packet to remove ECN marking, and sending the processed data packet to the second network.

In another aspect, the disclosure relates to a computer program product. The computer program product may include a computer-readable medium having codes for causing a computer to receive, at the interworking gateway, which may be in communication with a first wireless network and a second wireless network, a media data packet transmitted by a UE within the first wireless network. The media data packet may be ECN marked. The codes may further include codes for causing the computer to process the data packet to remove ECN marking, and send the processed data packet to the second network.

In another aspect, the disclosure relates to an interworking gateway. The interworking gateway may be in communication with a first wireless network and a second wireless network. The interworking gateway may be configured to receive a media data packet transmitted by a UE within the first wireless network. The media data packet may be ECN marked. The gateway may be further configured to process the data packet to remove ECN marking, and send the processed data packet to the second network.

In another aspect, the disclosure relates to an interworking gateway. The interworking gateway may be in communication with a first wireless network and a second wireless network. The interworking gateway may include means for receiving a media data packet transmitted by a UE within the first wireless network. The media data packet may be ECN marked. The gateway may further include means for processing the data packet to remove ECN marking, and means for sending the processed data packet to the second network.

In another aspect, the disclosure relates to a method for providing communications. The method may include sending a first set of media, from a UE in a first network, to a UE in a second network, receiving, in response to the sending a first set of media, a data rate adjustment request from an interworking gateway, and sending, in response to the data rate adjustment request, a second set of media to the UE in the second network at an adjusted rate. The data rate adjustment request may comprise a TMMBR or CMR.

In another aspect, the disclosure relates to a computer program product. The computer program product may include a computer-readable medium having codes for causing a computer to receive, in response to the sending a first set of media, a data rate adjustment request from an interworking gateway, and send in response to the data rate adjustment request, a second set of media to the UE in the second network at an adjusted rate. The data rate adjustment request may comprise a or CMR.

In another aspect, the disclosure relates to a communications device. The communications device may include a transmitter module configured to send a first set of media to a UE in a second network, and a receiver module configured to receive, in response to the sending a first set of media, a data rate adjustment request from an interworking gateway. The transmitter module may be further configured to send, in response to the data rate adjustment request, a second set of media to the UE in the second network at an adjusted rate. The communications device may be terminal or UE.

In another aspect, the disclosure relates to a communications device. The communications device may include means for sending a first set of media to a UE in a second network, means for receiving, in response to the sending a first set of media, a data rate adjustment request from an interworking gateway, and means for sending, in response to the data rate adjustment request, a second set of media to the UE in the second network at an adjusted rate.

In another aspect, the disclosure relates to a method for providing communications at an interworking gateway. The method may include receiving, from a first UE in a first network, a data rate adjustment request, wherein the data rate adjustment request is provided from the first UE in response to receipt a congestion indication in media provided from a second UE in a second network, and processing the rate adjustment request so as to provide integration of ECN functionality between the first and second networks.

The processing the rate adjustment request may include forwarding data rate adjustment information to the second UE if the interworking gateway determines that the second UE can support an adjusted data rate consistent with the data rate adjustment request. The interworking gateway may determine that the second UE can support an adjusted data rate during a negotiation session between the interworking gateway and the second UE. The processing the rate adjustment request may include transcoding media received from the second UE consistent with the data rate reduction request. The transcoding may include lowering the media data rate of the media received from the second UE so as to mitigate congestion in the first network.

In another aspect, the disclosure relates to a computer program product. The computer program product may include a computer-readable medium having codes for causing a computer to receive a data rate adjustment request, wherein the data rate adjustment request is provided from a first UE in response to receipt a congestion indication in media provided from a second UE in a second network, and process the rate adjustment request so as to provide integration of ECN functionality between the first and second networks.

In another aspect, the disclosure relates to an interworking gateway. The gateway may include a first network interface module configured to receive, from a first UE in a first network, a data rate adjustment request, wherein the data rate adjustment request is provided from the first UE in response to receipt a congestion indication in media provided from a second UE in a second network, and a processor module configured to process the rate adjustment request so as to provide integration of ECN functionality between the first and second networks.

The processor module may be configured to forward data rate adjustment information to the second UE if the interworking gateway determines that the second UE can support an adjusted data rate consistent with the data rate adjustment request. The gateway may further include a second network interface module, wherein the processor module is configured to determine whether the second UE can support an adjusted data rate during a negotiation session between the interworking gateway and the second UE through the second network interface module. The processor module may be configured to transcode media received from the second UE consistent with the data rate reduction request. The transcoding may be done by lowering the media data rate of the media received from the second UE so as to mitigate congestion in the first network.

In another aspect, the disclosure relates to an interworking gateway, The gateway may include means for receiving, from a first UE in a first network, a data rate adjustment request, wherein the data rate adjustment request is provided from the first UE in response to receipt a congestion indication in media provided from a second UE in a second network and means for processing the rate adjustment request so as to provide integration of ECN functionality between the first and second networks.am product may include a computer-readable medium having codes for causing a computer to receive a data rate adjustment request, wherein the data rate adjustment request is provided from a first UE in response to receipt a congestion indication in media provided from a second UE in a second network, and process the rate adjustment request so as to provide integration of ECN functionality between the first and second networks.

In another aspect, the disclosure relates to an interworking gateway. The gateway may include a first network interface module configured to receive, from a first UE in a first network, a data rate adjustment request, wherein the data rate adjustment request is provided from the first UE in response to receipt a congestion indication in media provided from a second UE in a second network, and a processor module configured to process the rate adjustment request so as to provide integration of ECN functionality between the first and second networks.

The processor module may be configured to forward data rate adjustment information to the second UE if the interworking gateway determines that the second UE can support an adjusted data rate consistent with the data rate adjustment request. The gateway may further include a second network interface module, wherein the processor module is configured to determine whether the second UE can support an adjusted data rate during a negotiation session between the interworking gateway and the second UE through the second network interface module. The processor module may be configured to transcode media received from the second UE consistent with the data rate reduction request. The transcoding may be done by lowering the media data rate of the media received from the second UE so as to mitigate congestion in the first network.

In another aspect, the disclosure relates to an interworking gateway, The gateway may include means for receiving, from a first UE in a first network, a data rate adjustment request, wherein the data rate adjustment request is provided from the first UE in response to receipt a congestion indication in media provided from a second UE in a second network and means for processing the rate adjustment request so as to provide integration of ECN functionality between the first and second networks.

The interworking gateway may process the media from the second network to make it ECN capable. For example, the received media may be marked consistent with an ECN protocol. The marking may be ECT marking. The marked media may be provided to the first network, where it may be delivered to the first UE.

Various additional aspects are further described below in conjunction with the appended drawings.

In various embodiments, the techniques and apparatus described herein may be used for interconnection between wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably. In addition, the techniques and apparatus described herein may be used for interconnection between wired and wireless communication networks, as well as interconnection between wired communication networks.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels may include the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. +Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the PDCCH is used for sending control, the PHICH for sending ACK/NACK, the PCFICH for specifying the number of control symbols, the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Systems and methods are described to facilitate processing and management of explicit congestion notification (ECN) across disparate networks, configurations, and protocols. The subject systems and methods may be used to provide local rate adaptation using ECN functionality, which may be done without the need to rely on other operators to upgrade and/or ensure their networks are ECN transparent or ECN-supported or capable.

In one aspect, an operator planning to use ECN for rate adaptation provides that at least its own supported network supports ECN. A gateway function between the operator's network and other networks, which may be wired or wireless and may be controlled by other operators, may serve as an ECN end-point in case the other networks involved in a call do not support ECN, either in whole or in part. The gateway function may be implemented in an interworking gateway device as described herein, or may be incorporated in other elements of a network, such as in components comprising a core network. In some implementations, the other network may include two or more disparate networks, each of which may be controlled by separate operators.

In one aspect, the following methods can be employed for providing gateway functionality. In one example implementation, a gateway first negotiates the use of ECN between itself and a local network UE if a far-end UE or associated far-end network involved in the call does not support ECN. The gateway may then receive ECN "congestion experienced" information from the local UE, and use this information to calculate and send a rate request to the local UE to adapt its uplink transmission. The local UE may then adapt the rate at which it provided media in response to the rate request, such as, for example, lowering the output data rate.

In some cases, the gateway may receive rate adaptation requests from the local UE and relay this information to a far-end UE, associated with a different, non-ECN supported network, to adapt its rate. The relaying of the request may involve translation of the local UE's rate request (e.g., Temporary Maximum Media Stream Bit Request, TMMBR, Real Time Transport Control Protocol (RTCP-APP), CMR, and the like) to a rate request that the far-end UE can understand. Alternatively or in addition, if the gateway does not relay the rate adaptation information to the far-end UE (or UE's), the gateway can perform transcoding of the media from the far-end UE to match the rate requested by the local UE. In this manner, ECN can be supported on the network associated with a given UE yet still allow communication with networks and associated UEs that do not support ECN functionality.

Attention is now directed to FIG. 1, which illustrates details of an implementation of a multiple access wireless communication system, which may be part of an LTE or other communication system on which ECN and rate adaptation functionality as described herein is implemented. An evolved Node B (eNB) 100 (also know as an access point or AP) may include multiple antenna groups, one including 104 and 106, another including 108 and 110, and an additional group including 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124. UEs 116 and 122, as well as others (not shown) may be configured to implement ECN functionality as described herein.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 400 utilize beam-forming in order to improve the signal-to-noise ratio of forward links for the different access terminals 116 and 124. Also, an eNB using beam-forming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

Figure 2:
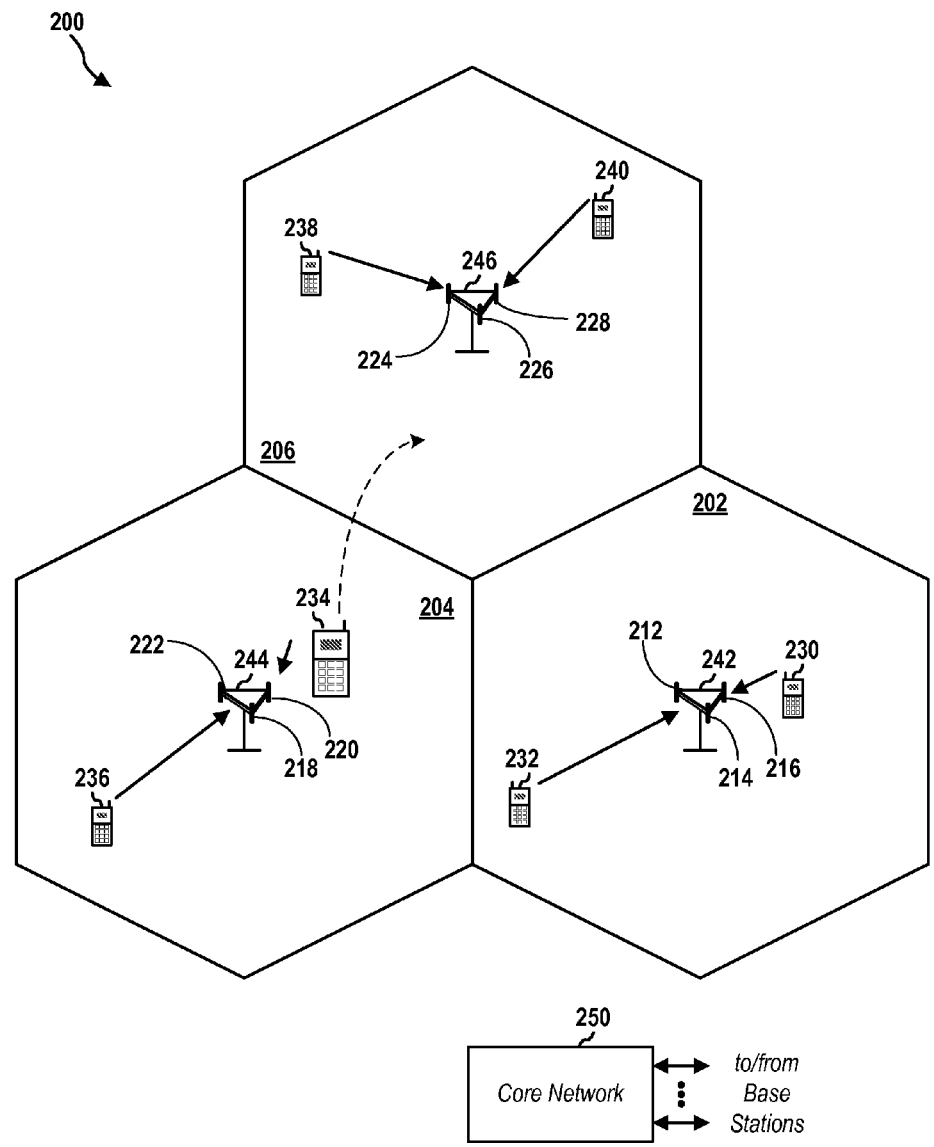
FIG. 2 illustrates details of a wireless communications system having multiple cells.

FIG. 2 illustrates details of an implementation of a multiple access wireless communication system 200, such as an LTE system, on which ECN and rate adaptation functionality as described herein may be implemented. The multiple access wireless communication system 200 may include multiple cells, including cells 202, 204, and 206. In one aspect the system 200, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment or UEs, which can be in communication with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network, such as may be used to perform functions as further described herein related to subframe partition allocation and configuration.

Figure 3:
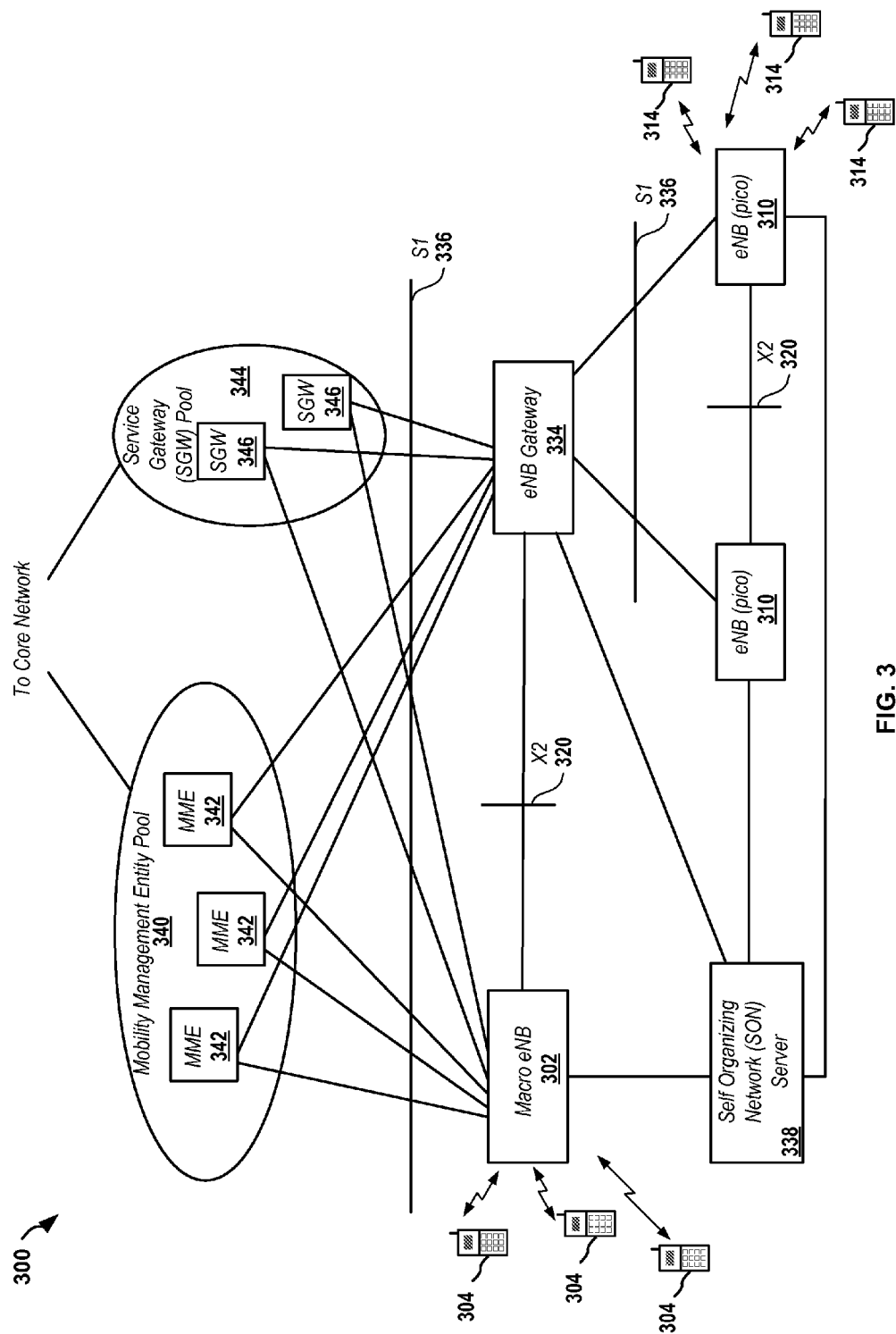
FIG. 3 illustrates details of connectivity in an example wireless communications system.

In various implementations, congestion processing and mitigation using ECN and rate adaptation functionality may be done in conjunction with other nodes and/or a core or backhaul network, which may facilitate interconnection between networks. FIG. 3 illustrates details of an example network embodiment 300 of eNB interconnection with other eNBs, example network components, and a backhaul network. Network 300 may include a macro-eNB 302 and/or multiple additional eNBs, which may be picocell eNBs 310 or other eNBs nodes such as femtocell eNBs or other base stations. Network 300 may include an HeNB gateway 334 for scalability reasons. The macro-eNB 302 and the gateway 334 may each communicate with a pool 340 of mobility management entities (MMEs) 342 and/or a pool 344 of serving gateways (SGW) 346. The eNB gateway 334 may appear as a C-plane and a U-plane relay for dedicated connections 336. An S1 connection 336 may be a logical interface specified as the boundary between an evolved packet core (EPC) and an Evolved Universal Terrestrial Access Network (EUTRAN). As such, it provides an interface to a core network (not explicitly shown in FIG. 3) which may be further coupled to other networks, and through which ECN and rate adaptation functionality as described herein may be performed. The eNB gateway 334 may act as a macro-eNB 302 from an EPC point of view. The C-plane interface may be S1-MME and the U-plane interface may be S1-U. Network 300 may include a macro-eNB 302 and multiple additional eNBs, which may be other macro-eNBs, picocell eNBs 310, femtocell eNBs and/or other base stations or network nodes.

The eNB gateway 334 may act towards an eNB 310 as a single EPC node. The eNB gateway 334 may ensure S1-flex connectivity for an eNB 310. The eNB gateway 334 may provide a 1:n relay functionality such that a single eNB 310 may communicate with n MMEs 342. The eNB gateway 334 registers towards the pool 340 of MMEs 342 when put into operation via an S1 setup procedure. The eNB gateway 334 may support setup of S1 interfaces 336 with the eNBs 310.

Network 300 may also include a self organizing network (SON) server 338. The SON server 338 may provide automated optimization of a 3GPP LTE network. The SON server 338 may be a key driver for improving operation administration and maintenance (OAM) functions in the wireless communication system 300. To facilitate this, an X2 link 320 may exist between the macro-eNB 302 and the eNB gateway 334. X2 links 320 may also exist between each of the eNBs 310 connected to a common eNB gateway 334. The X2 links 320 may be set up based on input from the SON server 338. An X2 link 320 may convey ICIC information. If an X2 link 320 cannot be established, the S1 link 336 may be used to convey ICIC information. UEs 304 may be served by eNB 302, and UEs 314 may be served by eNB 310. All of the nodes shown in FIG. 3, as well as others (not shown) may be under control of a first operator. Alternately or in addition, other UEs and/or eNBs (not shown) may also be included and may have connected UEs. UEs 304, 314, and/or others (not shown) may be in communication with other eNBs or other network devices in separate or different networks (e.g., far or second network nodes) that are controlled by second or additional operators.

Figure 4:
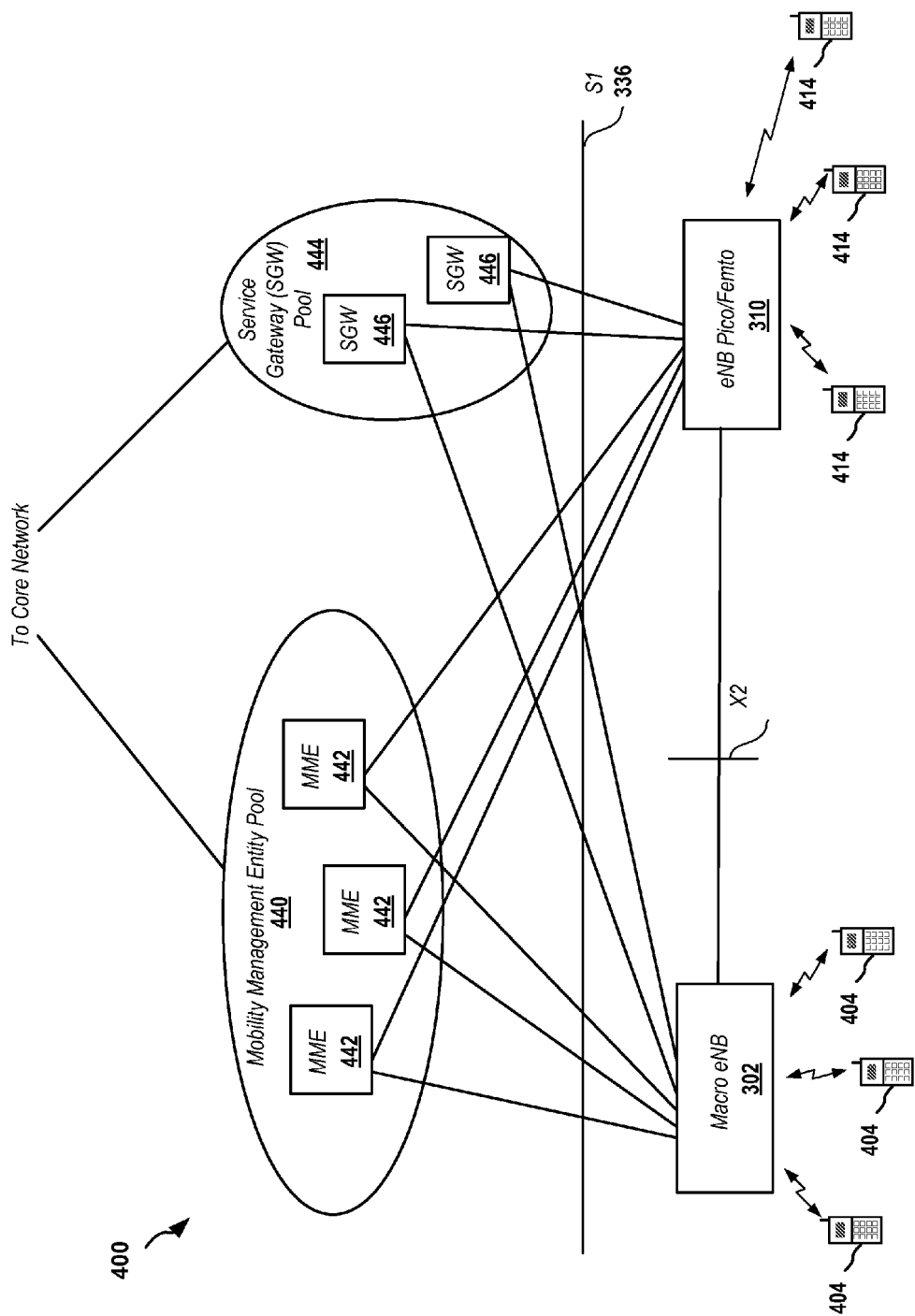
FIG. 4 illustrates details of connectivity in another example wireless communications system.

In accordance with one aspect, UEs associated with a first operator may communicate with UEs associated with a second operator using ECN and/or other and rate adaptation functionality as described herein. FIG. 4 illustrates another example of a network embodiment 400 of eNB interconnection with other eNBs and a backhaul or core network (not shown), which may be associated with the first operator. In network 400, no SON server is included, and macro eNBs, such as eNB 402, may communicate with other eNBs, such as pico eNB 410 (and/or with other base stations or network nodes that are not shown). In accordance with one aspect, UEs associated with a first operator may communicate with UEs associated with a second operator using ECN and/or other functionality as described herein.

Figure 5:
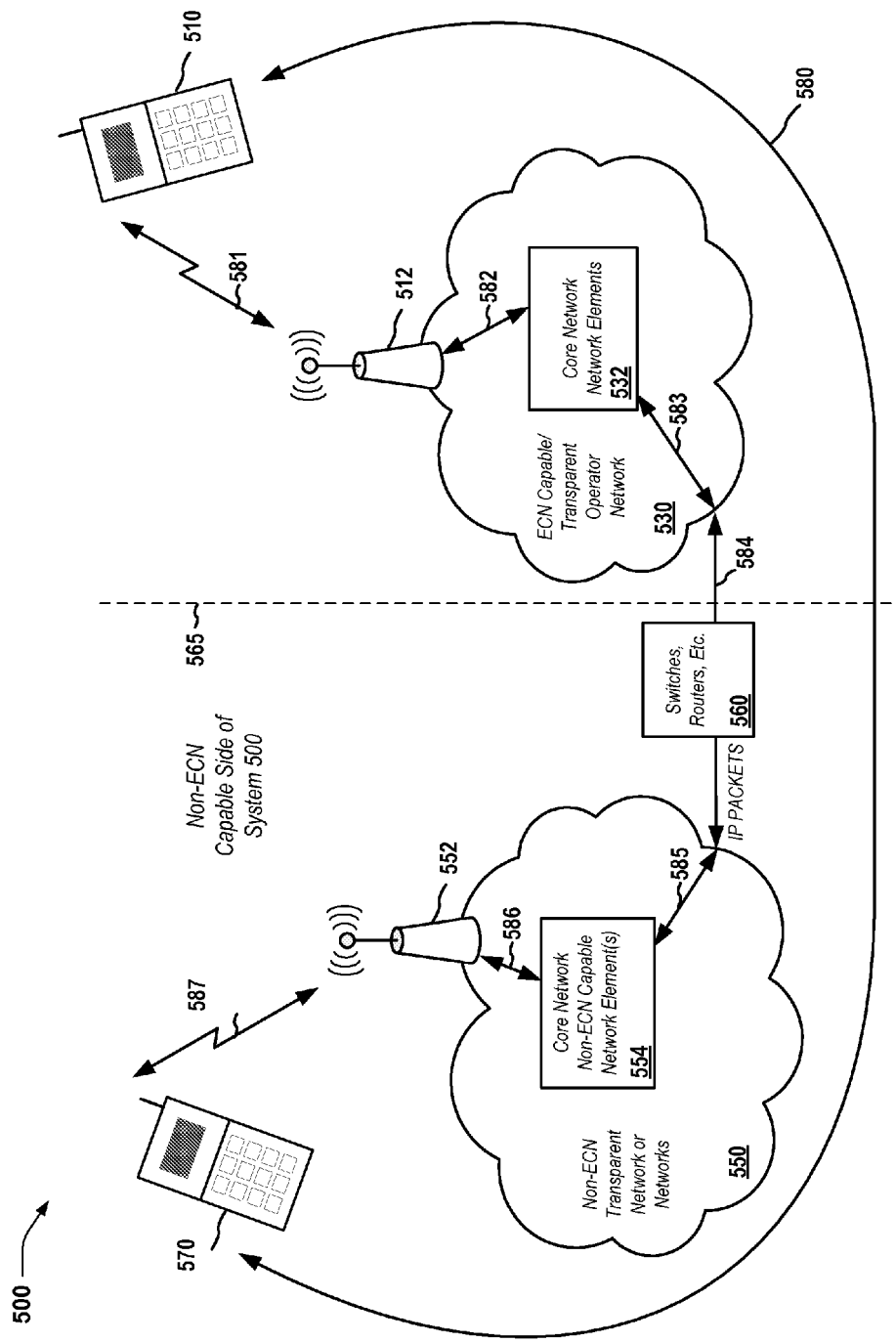
FIG. 5 illustrates details of interconnection between ECN capable and non-ECN capable networks.

Attention is now directed to FIG. 5, which illustrates details of a communications system 500. System 500 includes at least a first network 530, which is configured to support ECN or be ECN compliant or capable, as well as one or more additional networks 550, which are non-ECN capable, either in whole or in part. As noted previously, a network that supports ECN functionality is said to be ECN Transport Capable (ECT), and may also be described herein as being ECN capable or ECN compliant. Likewise, a network that does not support ECN functionality may be referred to as non-ECN compliant or non-ECN capable. In general, a non-ECN capable network is one in which one or more network components do not support ECN functionality, such that connections to terminals or UEs in the network do not support ECN functionality.

Networks 530 and 550 may be operated by different operators, in which case information about the capabilities of one network may not be known or available to the other. For example, network 530 may not know whether or not network 550 is or is not ECN capable. Likewise, network 550 may be aware of network 530's capabilities.

As shown in FIG. 5 by way of example, network 550 may be non-ECN capable, while network 530 may be ECN capable. Network 530 may be controlled by a first operator, for example, AT&T, while network 550 may be controlled by a second, different operator, for example Verizon. A logical boundary 565 may exist in system 500 between the ECN capable and non-ECN capable sides shown in FIG. 5. In various configurations, the non-ECN capable side may include network 550, as well as, in some cases, addition networks (not shown) as well as transport infrastructure 560, which may include components such as switches, routers, cabling, wireless connection, and the like. Connectivity between networks 530 and 550 may include transmission of signaling, which may be, in an exemplary example, Internet Protocol (IP) packets, between networks 530 and 550, as well as their respective terminals or UEs 510 and 570, which may be routed using various infrastructure mechanisms.

In the example shown in FIG. 5, UEs 510 and 570 may have an established connection or link 580, which may be routed through the various components as shown (as well as others not shown for clarity). For example, data or media, which may correspond to digitized voice for transmission over IP (VOIP) may be sent via communications link 581 between UE 510 and a base station 512, which may be an eNB such as shown previously in FIGS. 1-4. The data may then be sent from base station 512 to core network components 532 through connection 582, which may be, for example, configured as shown in FIG. 3 or 4. The data may then be processed through core network components 532, and be provided through connections 583, 584 and 585 to core network components 554 of network 550, which, as previously noted, may be non-ECN capable.

The data may then be sent from the core network components 554 to one or more base stations 552 of second network 550, and may be further transmitted wirelessly, via connection 587, to a terminal or UE 570. In some implementations the connection 587 to UE 570 may be a wired connection rather than a wireless connection.

In implementations where ECN is used, in order to insure proper ECN operation, an operator must ensure that its core network elements and transport routers are ECN-transparent. This is necessary for ECN rate adaptation functionality to operate properly throughout the operator's network. In particular, ECN transparency requires that the network element/transport router should not drop marked packets (i.e., ECT or ECN-CE marked packets) unless there is congestion requiring such dropping; should not reset the ECN bits of ECN-CE marked packets; and should not change the ECN bits of ECT-marked packets unless there is congestion experienced.

Although an operator can generally ensure its own network elements and routers are ECN-transparent to the extent that the operator configures and controls its own network, UEs associated with the first operator, for example, terminal or UE 510, may perform calls to terminals in other operators' networks, such as UE 570.

When the second operator's network (e.g., network 550) is not configured for and/or does not provide ECN-transparency, the first operator cannot guarantee that terminals 510 and 550 will be able to establish end-to-end ECN rate adaptation. In this case, for example, packets may be dropped and/or other ECN functionality may also be impaired or non-functional. For example, if a first operator were to deploy ECN-capable UEs, such as UE 510, but not ensure that its network elements were ECN-transparent, then ECN operation would be unreliable. Moreover, unreliable operation may also derive from the specific limitations of components of a second operators network, such as the components of network 550, for example core elements 554, as well as others (not shown). For example, packets that are ECN-marked by intermediate nodes in the first network, and/or by other nodes in, for example, element 560, such as with CE or ECT marking, may be dropped or may otherwise be mishandled or have the indications removed by nodes in the non-ECN capable network 550.

One way to potentially determine the capability of a network is to use probing. For example, ECT probing is described in 3GPP S4-09060 and 3GPP 54-070314, which are incorporated by reference herein. When ECN probing is performed, UEs may disable ECN when they determine that transport is not ECN-transparent. In particular, this requires that the operator ensures that the core network elements of Proxy Gateway (Proxy-GW) and Serving Gateway (Serving-GW), as well as transport path routers, are transparent for ECN operation.

As one example, at the start of an RTP session, when the first packets with ECT are sent, it may be useful to verify that IP packets with ECN field values of ECT or ECN-CE will reach their destination(s). There is some risk that the usage of ECN will result in either reset of the ECN field or loss of all packets with ECT or ECN-CE markings. If the path between the sender and the receiver exhibits either of these behaviors it may be desirable to stop using ECN to protect both the network and the application.

As a result, this may introduce procedures that the UE's must perform to attempt to probe and monitor the transport path to try to determine whether this will happen, which may lead to inefficiency or other problems, such as excess power consumption, congestion, and the like. Specifically, A) The UE's may perform probing of the transport path to determine if it is an ECT (ECN capable transport) before "turning on" ECN. B) The UE's may monitor the transport path to determine if a change in route path has caused a problematic router to enter the transport path, making it non-ECT. C) If ECT failure is detected, then the UE may falls back to turning off ECN. The UE then retries with more probing to determine if the path has become an ECT once again.

These procedures can cause complexity in the UE by requiring probing, monitoring, falling back, and/or retrying (for example, as described above and as discussed in, for example, 3GPP S4-090607, which is incorporated by reference herein). Reliability raises concerns about how a simple packet loss, or even worse, a burst of packet losses on the wireless link will affect the reliability of probing and ECT failure detection. Aggressive probing (e.g., marking many packets with ECT, where ECT is used as marking to indicate ECN capable as further described subsequently herein) might allow for more robust detection of ECT, but it increases the probability of media clipping if the transport is non-ECT. Also, mis-detecting non-ECT because of packet losses could cause ECN to be unnecessarily disabled, thus disabling rate adaptation. This could result in "flapping of the ECN state" between ECT and non-ECT. Delay where probing the transport for ECN support requires balancing the need to send enough probes to reliably detect the transport behavior quickly while minimizing the number of probes because each of these probes carries media that can be dropped if the transport is non-ECT. Example recommendations require that at least two probes be sent per standard Real Time Transport Control Protocol (RTCP) reporting interval and that the sender wait until at least 4 probes have been sent before evaluating the ECN Feedback message to determine if the transport is ECN-capable.

Sending the minimum number of probes implies that probing of the channel should be performed over at least 1-2 regular RTCP reporting intervals. This means that under such a situation ECN is initialized after sending media transmission for longer than at least one RTCP reporting period. This could delay the "rate adaptation mechanism" by that amount of time. This problem cannot be simply solved by slowing the ramp up rate of the codec mode in the MTSI Initial Codec Mode procedures because this would unnecessarily degrade the initial voice quality for all VoIP calls for an extended period of time, or simply increasing the number of ECT marked packets during probing to speed up the reaction time, as this increases the risk of media clipping.

It is possible to have an eNB ECN-CE mark the probing packets to indicate congestion in the path prior to initialization of ECN. However, since the number of probing packets are small, the media sender that receives an indication of a small number of ECN-CE marked packets at the receiver may not be able to react as reliably to such feedback. For example, some 3GPP specifications state that the media sender should treat the media receiver's reception of ECN-CE marked packets as it would react to packet losses. However, one would not expect a media sender to significantly reduce its rate in response to a few packet losses For RTCP bandwidth for feeding back received ECN data to media sender, various specifications rely on sending back an ECN message (or RTCP XR) indicating which received media packets are ECT or CE marked or dropped. These specifications also recommend that the receiver sends this ECN message under the following conditions: ASAP (immediate or early AVPF mode) after detecting an ECN-CE marked or dropped packet and included in every regular compound RTCP packet that is to be transmitted. The amount of data that is reported and the frequency of the reporting may be of concern.

When included in a compound RTCP packet, the ECN message is required to report the status of received packets over the last 3 RTCP reporting periods. By some calculations, that could be up to 750 VoIP packets being reported on. For each of these packets the ECN message would indicate whether the packet was dropped, ECN-CE, or ECT marked, requiring at least 2 bits for each of the packets being reported. There can be a reduction in the message size by using lossless compression. But the typical compression ratios will have to be estimated based on the variation in the state of packets received (e.g., how often are packet losses detected at the receiver).

When an ECN message is triggered by a packet loss or reception of an ECN-CE marked packet, it does not have to report on such a large window of packet arrivals. However, it is still recommended to include an RR or SR, which will increase the overall RTCP packet size even when reduced size RTCP packets are sent. The combination of the message size and frequency of reporting would increase the RTCP reporting bandwidth for VoIP. This adds a significant amount of signaling overhead compared to the rate adaption solution used for UMTS Circuit-Switched voice calls where signaling occurs at most once when the codec mode needs to be changed. Furthermore, if the RTCP bandwidth is kept small via the RR and RS SDP attributes, then the need to constantly send back the ECN message could starve (i.e., increase reporting delay) other AVPF messages when the eNB decides to mark all media packets during the congestion periods or the busy hour.

In summary, the above-described complexity and problems in implementing ECN functionality between ECN capable and non-ECN capable networks suggest other approaches for facilitating communications across networks, such as across networks controlled by different operators.

Figure 6:
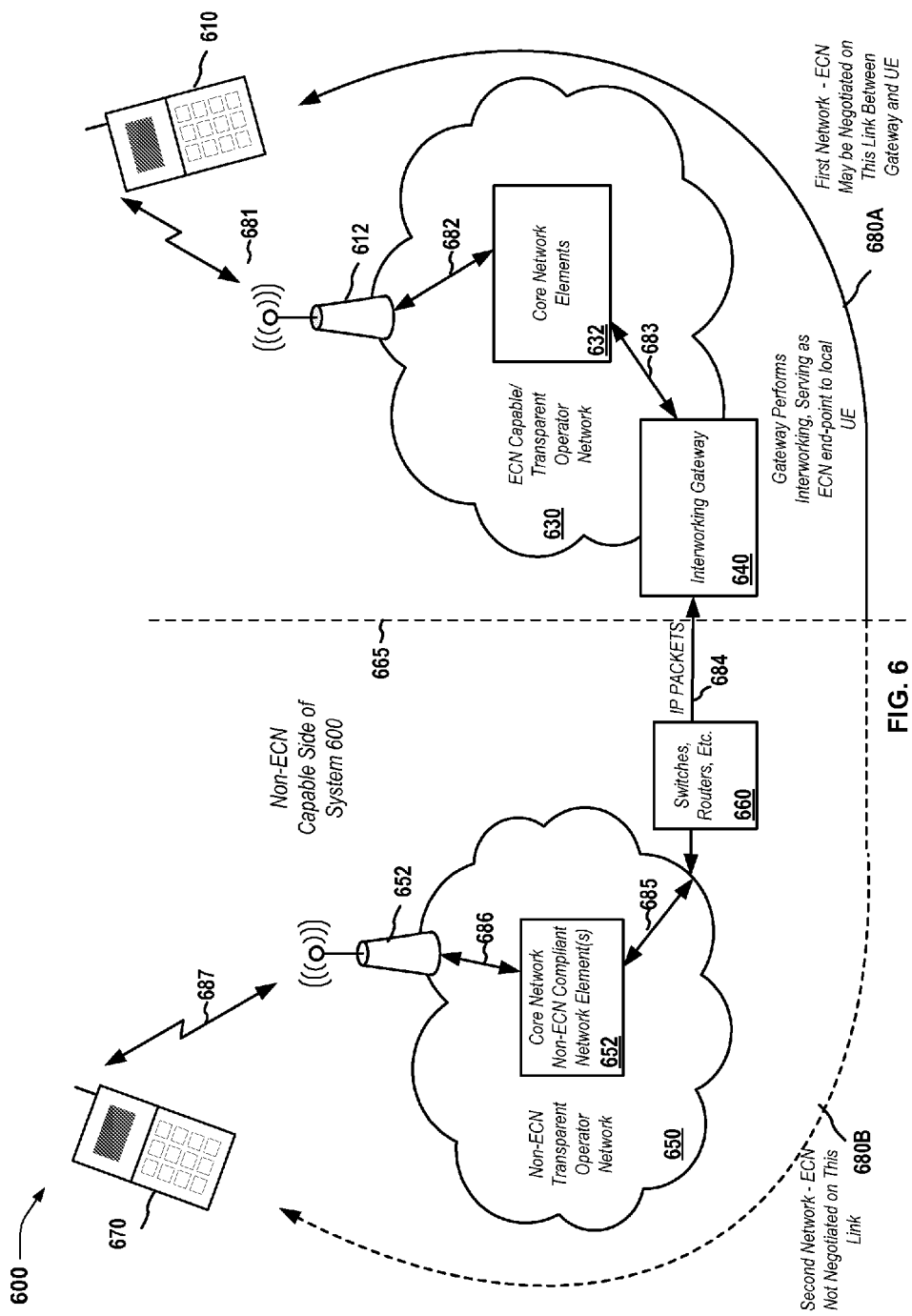
FIG. 6 illustrates details of an embodiment of a system including interconnection between ECN capable and non-ECN capable networks using an interworking gateway.

FIG. 6 illustrates details of an embodiment of a communications system 600 on which aspects may be implemented. In this example, system 600 includes at least a first network 630, which is configured to support ECN or be ECN compliant or capable, as well as one or more additional networks 650, which are non-ECN capable, either in whole or in part. Networks 630 and 650 may be operated by different operators, in which case information about the capabilities of one network may not be available or accessible to the other. For example, network 630 may not know whether or not network 650 is or is not ECN capable. Likewise, network 650 may not be aware of network 630's compliance or non-compliance.

As with the example shown in FIG. 5, network 630 may be controlled by a first operator, for example, AT&T, while network 650 may be controlled by a second, different operator, for example Verizon. Similarly, a logical boundary 665 may exist in system 600 between the ECN compliant and non-ECN compliant sides. In various configurations, the non-ECN compliant side may include network 650, as well as, in some cases, addition networks or network elements (not shown) and transport infrastructure 660, such as switches, routers, cabling, wireless connection, and the like. Likewise, connectivity between networks 630 and 650 may include transmission of signaling, which may be, in an exemplary example, Internet Protocol (IP) packets, between networks 630 and 650, as well as their respective terminals or UEs 610 and 670, which may be routed using various infrastructure mechanisms.

In the example shown in FIG. 6, UE 610 and 670 may have an established connection or link 680, which may be routed through the various components as shown (as well as others not shown). For example, data, which may correspond to digitized voice for transmission via voice over IP (VoIP) may be sent via communications link 681 between UE 610 and a base station 612, which may be an eNB such as shown previously in FIGS. 1-4. Data may be generated from inputs such as analog audio (e.g., a user's voice or other audio source) and converted to digital data via a Coder-Decoder (Codec). In general, the terminal at the other end of the connection may need to use the same codec to convert the data back to analog output. The rate of data conversion may be controlled by the codec, which may be done based on data rate signaling received from other network elements, such as gateway 640, as further described subsequently. The data may be formatted as a message or packet, such as in the form of an IP packet.

Once generated, the data may then be sent from base station 612 to core network elements 632 through connection 682, which may be, for example, configured as shown in FIG. 3 or 4. The data may then go through core network components 632, and be provided to an ECN interworking gateway 640 through connection 683. Gateway 640 may be configured to perform various ECN functionality as further described subsequently herein. In some implementations, interworking gateway 640 may be implemented as a separate system or systems, whereas, in other implementations, interworking gateway 640 may be integrated, in whole or part, within other network elements, such as, for example, the core network elements 632.

In communication with a second network, such as network 650, gateway 640 may provide modified or adjusted media data, which may be modified from the data provided from connection 683 to remove ECN functionality signaling and provide the modified data to transport elements 660 via connection 684. The modified media data may then be received at network 650, and further provided to terminal 670, such as through connections 685 through 687 via base station 652, in a non-ECN capable fashion. Similar connectivity between terminals 670 and 610 may be provided in the opposite direction to facilitate two-way communication and corresponding functionality between terminal 670 and 610. In an exemplary embodiment, media may be modified by removing ECN markings, such as ECT or CE markings, from packets received from a first network node, such as UE 610, as well as for signaling the first network and associated nodes regarding rate adjustments. An example of this is further described subsequently herein. Alternately, or in addition, the interworking gateway may be configured to transcode or adjust data rates for media between the first and second networks, and/or to perform a combination of these functions or others described herein.

The connection between terminals 610 and 670 in this example may be viewed as a two-part connection, shown as sub-connections or links 680A and 680B, as opposed to the single connection or link 580 shown in FIG. 5. In an ECN-supported sub-connection 680A, connectivity from the first network may appear transparent to the ECN capabilities of the other network. For example, from the perspective of UE 610, a connection to UE 670 may appear to be ECN-capable, irrespective of the actual configuration of network 650 (and/or the configuration of any additional or intermediate networks, which may be non-ECN compatible). In effect, the gateway 640 may function as a termination for ECN signaling to and from UE 610. Likewise, from the perspective of UE 670, the connection 680B to UE 610 may appear agnostic or may appear to be non-ECN compatible, even if ECN-functionality is supported from UE 610.

Figure 7:
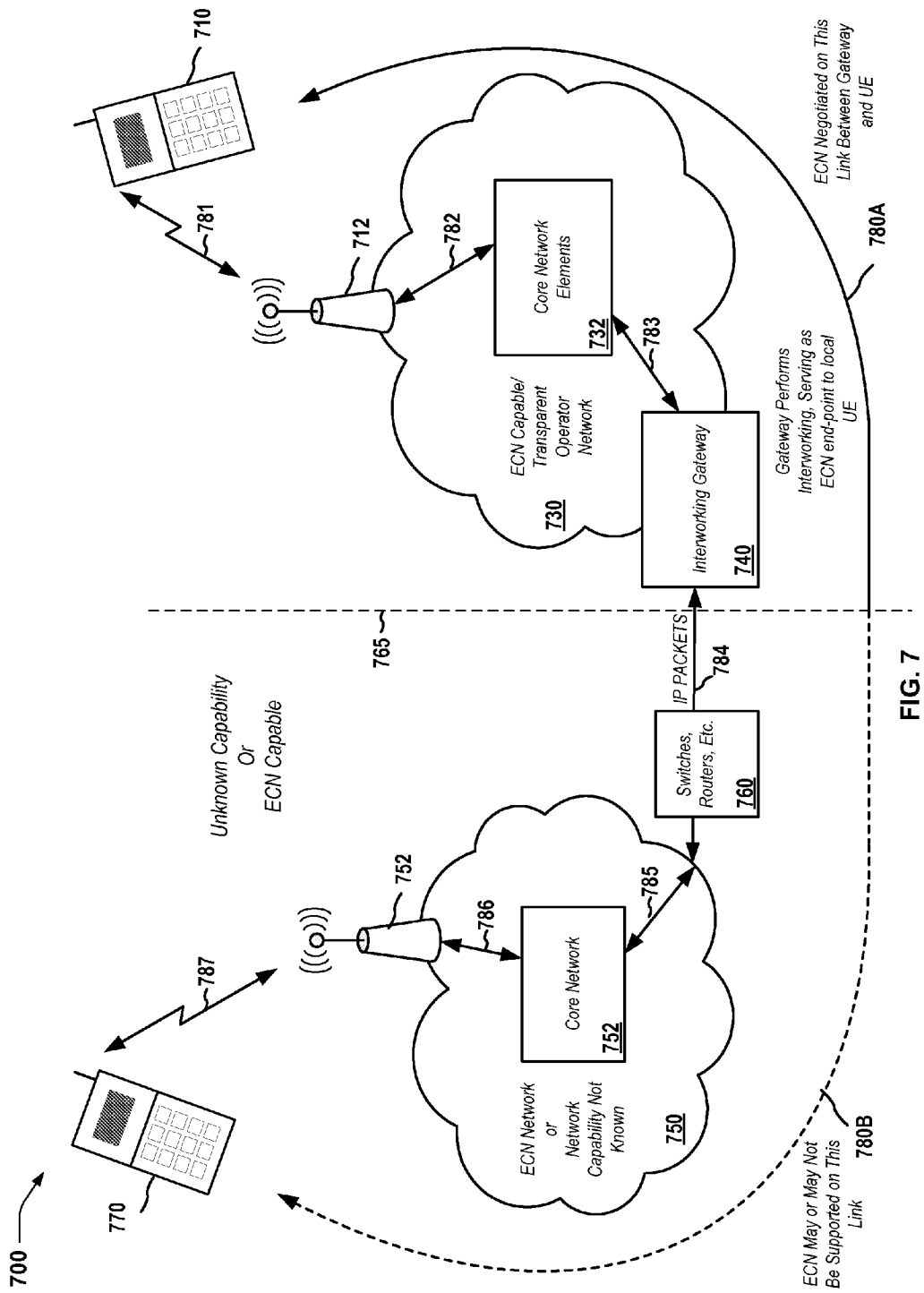
FIG. 7 illustrates details of an embodiment of a system including interconnection between an ECN capable network and another network having either unknown ECN capability or that may also be ECN capable.

As further described subsequently, this functionality may be facilitated by gateway 640, which may be, in various implementations, provided as a component of the core network, as a component of other elements of the first operator's system, and/or as a separate component (such as is shown in the example configuration of FIG. 6). Gateway 640 may be located within the infrastructure of the first operator, or in some cases may be external to the first operator's network. For example, in some implementations gateway 640 may be located in transport components 660, or may be between other networks (not shown in FIG. 6). In some implementations, such as shown in FIG. 7, a gateway may be provisioned between a first ECN capable network and a second network of unknown ECN capability. In addition, in some implementations, a gateway may be provisioned between two ECN capable networks while still providing interworking capability between the two networks as further described subsequently.

Returning to FIG. 6, functionality provided by gateway 640 may be done by providing local rate adaptation between terminals or UEs in the first operator's network and those of other networks. In order to do this, gateway 640 may be configured to function as an ECN endpoint for UE 610 to enable local rate adaptation when network 650 (and/or other connecting networks or transport components) are not ECN-capable.

ECN functionality within an IP network mark operates by adding certain bits to the IP header to encode different codepoints. For example, the two least significant (i.e., right-most) bits of the DiffServ field in the IP header may be encoded as follows: 00: Non ECN-Capable Transport; 10: ECN Capable Transport ECT(0); 01: ECN Capable Transport ECT(1); 11: Congestion Encountered (CE). When both endpoints support ECN then they may mark their packets with ECT(0) or ECT(1). If the packet traverses a queue supporting early congestion detection, such as a Active Queue Management (AQM) queue, it may change the codepoint to CE instead of dropping the packet. This is also know as "marking" and its purpose is to inform the receiving endpoint of impending congestion. At the receiving endpoint, this congestion indication may be handled by an upper layer protocol (e.g., TCP) and may be echoed back to the transmitting node in order to have it reduce its transmission rate.

In an exemplary embodiment, interworking gateway 640 may be configured to perform one or more of the following functions to facilitate transport ECN functionality between networks for congestion mitigation:

1. Negotiate use of ECN between the gateway 640 and the local UE (e.g., UE 610) at call set-up if the far-end UE (e.g., UE 670) and/or the far-end network (e.g., network 650) does not support ECN. In this way, the local UE may operate in a transparent fashion as if the other network and terminal is ECN-capable.

2. During a session, provide rate adaptation feedback. For example, if the gateway 640 receives congestion encountered (CE) markings from the local UE's uplink and if the far-end terminal (e.g., UE 670) is not ECN-capable, then the gateway 640 may read the CE-codepoint marking information to determine an appropriate rate and send a TMMBR, CMR or other rate request data or message to the local UE to request this transmission rate (typically a lowered transmission rate) on its uplink.

3. During the session, the gateway may lower the rate of media sent on the downlink path to the local UE to match the rate request limit (e.g., TMMBR) from the local UE. This may be done by the gateway in the following manner: The gateway effectively relays the rate request information from the local UE (TMMBR) to the far-end UE, translating this into an appropriate command to the far-end UE when necessary (for example, as an RTCP-APP codec mode request, in-band codec mode request via RTP, and the like). This enables the far-end UE to encode its media at a rate requested by the local UE, thus achieving end-to-end rate adaptation in the downlink direction to the local UE.

In some implementations, rate adjustment processing may be done in whole or in part by other nodes within the first network in addition to UEs, such as by base station 612. For example, base station 612 may receive a rate reduction request from interworking gateway 640 and instruct UE 610 to adjust its output data rate.

In another aspect, if gateway 640 does not relay the rate request information from the local UE, the gateway 640 may "transcode down" the media data received from the far-end UE to the rate requested by the local UE. Transcoding from G.711 to dynamically changing target rates is already required in the MGW to support calls to public switched telephone network (PSTN) terminals. The functionality described above may be used to extend this functionality to support transcoding from a non-G.711 codec. The transcoding of rate may only be required in the downlink direction and may only be required for reducing the rate (i.e., there would generally be no need for the gateway to transcode the media from the far-end if its rate is lower than requested by the local UE). Degradation in voice quality should be minimal compared to the end-to-end case since the transcoding is targeted toward the same lower quality/rate for both scenarios.

One potential concern for ECN implementations relates to the complexity of having the UEs probe and monitor the transport path to ensure that it is currently and in the future remains ECN-transparent. However, based on the above-described embodiments, there may be no need for a local UE such as UE 610 to probe the transport path. When an ECN-capable local UE is in its home network, it is guaranteed that its network elements are ECN-transparent to the extent the network is configured as such. Furthermore, if the local UE establishes an MTSI session with another UE, such as UE 670, in another operator's network, such as network 650, that does not support ECN, the aspects described about would still enable rate adaptation for the local UE in the home network.

In some cases, terminals or UEs may roam into other operator's networks. ECN functionality through use of an interworking gateway may also be addressed in this case. For example, an ECN-enabled UE, such as UE 610, may roam into a non-ECN-capable network, such as network 650, and make a call to an ECN-UE in another ECN-transparent network. In this case, since both UEs may be ECN-capable, ECN may be negotiated end-to-end, but it is possible that the non-ECN-transparent network will drop media packets, which can result in potential loss of media.

One solution to this roaming problem is to provide border routers for the ECN-transparent network to remove ECN capability from SDP, and may further invoke mechanisms for handling ECN locally if the routers cannot confirm (e.g., through service level agreements (SLAs)) that the SDP comes from an ECN-transparent network.

In another roaming example, when a non-ECN-UE, such as UE 670, roams into an ECN-transparent network, such as network 630, ECN will not be enabled for this UE (since it lacks ECN capability). Consequently, the operator of network 630 cannot rate adapt the UE that has roamed into its network. However, the number of in-bound roamers with non-ECN capability should be expected to be relatively small compared to the total number of local UEs in the operator's network. Therefore the impact of these roamers not rate adapting should be expected to be minimal.

Rate decision feedback may be sent from the media receiver to sender using, for example, RTCP APP packets as defined in 3GPP TS 26.114, which is incorporated herein by reference. As such, the more generic message, TMMBR, can be used to cover all codecs, including video codecs. Support of the TMMBR message is already required for Multimedia Telephony Services for IMS (MTSI) video services in 3GPP TS 26.114 and can therefore be extended for use for all codecs.

In general, there may be no need for an ECN Feedback message. Sending an ECN feedback message may raise the following concerns. Sending requires a significant amount of RTCP bandwidth, especially when compared to the amount of bandwidth that is needed for VoIP media. The procedures specified for using ECN Feedback messages and RTCP APP packets can cause "double adaptation" ambiguity at the media sender. The media receiver requests a certain rate from the media sender using the RTCP APP packet, while the media sender is required to adapt its rate using the information in the ECN Feedback message. Since the rate information is being fed back directly to the media sender and the MTSI terminals do not have to probe the transport path, there may be no need to send the ECN feedback message.

Not all operators may be interested in the rate adaptation feature using ECN, and therefore ECN capability may be optional in the UE and/or network. An operator that is interested in deploying such capability can require UE vendors to implement this in their terminals and require infrastructure vendors to ensure that their network elements meet the applicable requirements.

FIG. 7 illustrates another communication system 700 on which aspects may be implemented. In system 700, the first network 730 may be configured similarly to network 630 of FIG. 6, and may include similar elements, including a first UE 731, base station or eNB 712, a core network 732, an interworking gateway 740, as well as other intermediate elements (not shown). Data may be similarly be routed through links 781, 782, and 783 between the first UE 710 and gateway 740, so as to form a first network link 780A.

However, the capabilities of the second network 750 may be either unknown (i.e., the second network may be ECN capable but the first network may not be able to determine whether or not it is, or in some cases both the first and second network may be ECN capable. For example, core network 752, base station 752, terminal or UE 770, and/or other components such as components 760 may or may not be ECN capable. In network 750, signaling may be provided from the gateway 740 through links such as links 784, 785, 786, and 787, similarly to the connections shown in FIG. 6. Link 780B may comprise an unknown or ECN capable link, depending on the configuration. In any of these cases, the interworking gateway 740 may be configured to provide functionality analogous to that described with respect to network 600 by acting as an ECN termination for congestion indications from either of the first or second network or both, as well as providing ECN functionality transparency for one or both networks.

For example, in one case, the operator of the first network may choose to never negotiate ECN capability with the second network. Alternately, the interworking gateway may negotiate ECN operation with both the first and second networks. In this case, the gateway may receive, for example, ECN marked media, where it may either forward the ECN marked packets to the nodes of the first network may process them, such as for, example to transcode media to different rates, depending on the rates supported by devices in the first and second networks.

In another example, sender-driven congestion control, rather than receiver driven congestion control, may be implemented. In the examples previously described, ECN receiver-driven congestion control is generally used (i.e., the receiver uses the congestion information to determine what rate the sender should use, which is signaled to the sender, such as through a rate adjustment request). In implementations using sender driven congestion control, the receiver indicates to the sender that congestion is encountered, but the sender decides what rate to use. In this case, the interworking gateway may be configured to negotiate sender and receiver congestion control between nodes in the two networks, and in particular between networks that use different approaches (i.e., sender in one, receiver in another). In some cases, when a CE marking is received, the interworking function may decide to generate an ECN feedback message, such as, for example, marking media with ECN markings. In addition, the interworking function may be used to negotiate rates between nodes in first and second networks, even if both are ECN capable.

In some cases, more that one network may be interconnected, such as, for example, in the case of a three way call between users in three different networks, which may be controlled by three different carriers. In this case, the interworking gateway may be configured to provide interworking between the three (or more) networks, such as, for example, by negotiating rates between the various networks, transcoding media between the different networks, manage interworking between the various networks, or providing other interworking functionality similar to that described elsewhere herein. For example, the interworking gateway may be used to signal rate reductions from nodes in one of the networks, but not others. Alternately, or in addition, media can be transcoded between the multiple networks based on particular network congestion conditions.

Figure 8:
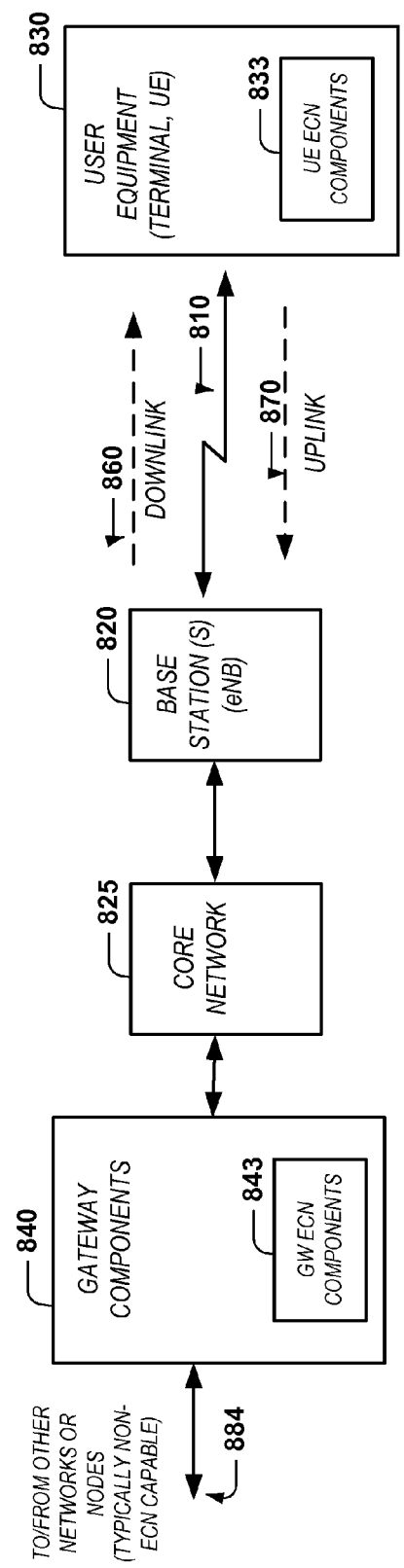
FIG. 8 illustrates details of an embodiment of a sub-system for facilitating communications between a terminal or UE and an interworking gateway in an ECN capable network.

Attention is now directed to FIG. 8, which illustrates details of an embodiment of a system 800 that be used to provide ECN functionality between interworking gateway components 840, which may correspond to interworking gateway 640 of FIG. 6 or interworking gateway 740 of FIG. 7, and one or more UEs 830, which may correspond to UE 610 or UE 710, in the same operator-associated network. System 800 may include one or more base stations 820 (also referred to as a node, evolved node B—eNB, serving eNB, target eNB, macronode, femtonode, piconode, and the like) which may be an entity capable of communication over the wireless network 810 (or networks) to various terminal devices 830, such as, for example, those shown in FIGS. 1-4 and 6-7. For instance, each device 830 can be an access terminal (also referred to as terminal, user equipment (UE), mobility management entity (MME), mobile device, and the like). The base station 820 and/or devices 830 may include an explicit congestion notification (ECN) component 833 that communicates to the gateway component 840. Corresponding Gateway ECN components 843 may be provided to facilitate interconnectivity between UE 830 and devices in another network, such as UEs in a different operator's network, which may be non-ECN capable. This may be done through connection 884, which may correspond to connections 684 and 784 of FIGS. 6 and 7.

As shown, the base station 820 may communicate to the device 830 (or devices) via a downlink (DL) 860 and may receive data via uplink (UL) 870. Such designation as uplink and downlink is arbitrary as the device 830 can also transmit data via downlink and receive data via uplink channels in various implementations. It is noted that although two components 820 and 830 are shown, more than two components may be employed on the network 810 (and/or on other networks and network implementations).

In general, system 800 is configured to process explicit congestion notification (ECN) protocols across disparate networks as described herein. This may include communicating the ECN protocol to at least one device 830 (or devices 830). The gateway component 840 may then process the ECN protocol in conjunction with the device(s) 830 and at least one local network, which may be ECN capable, where the gateway component 840 further communicates data from the device 830 and the local network to at least one other network that do not support the ECN protocol or for which ECN capability may be unknown.

Figure 9:
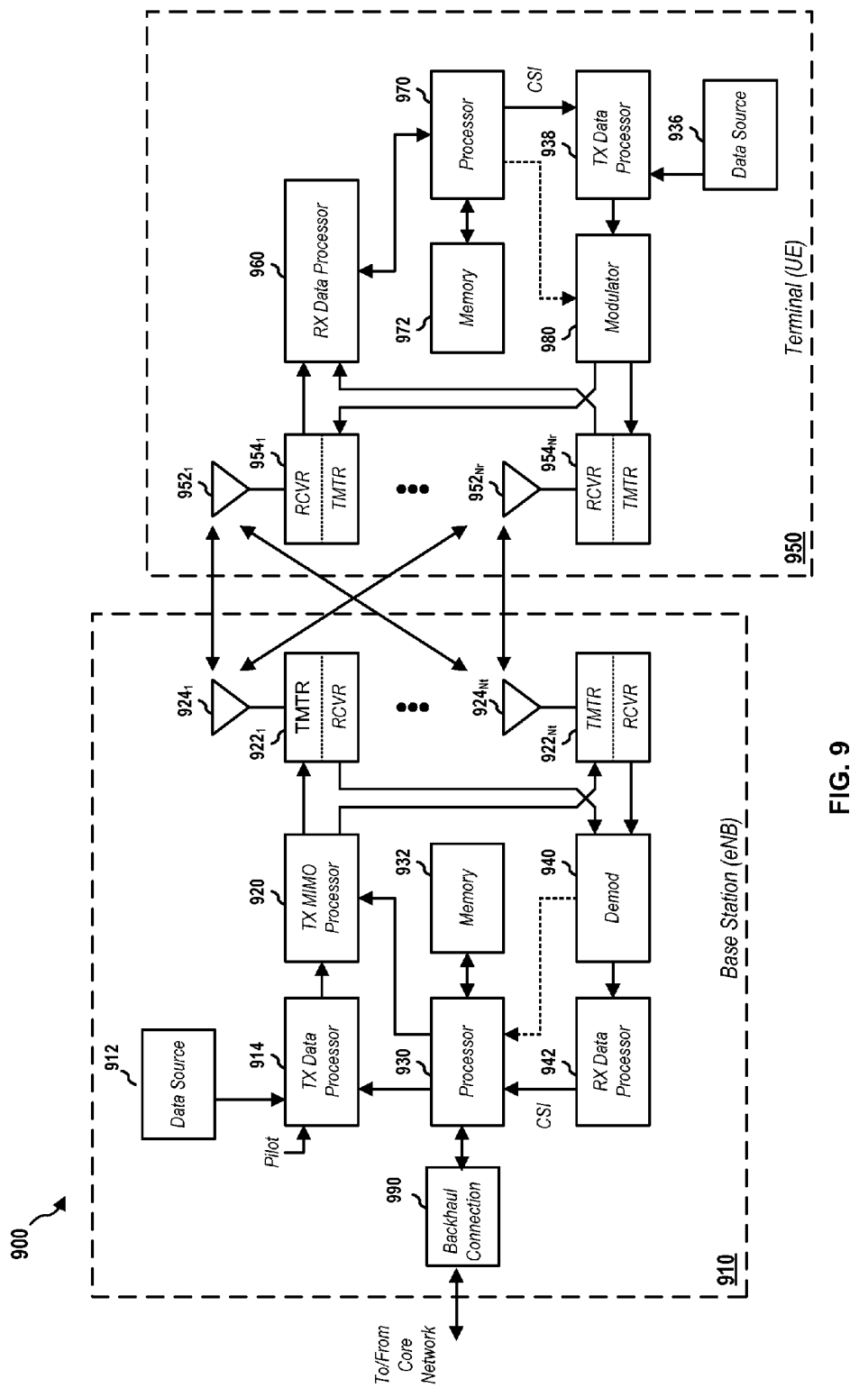
FIG. 9 illustrates details of an embodiment of a terminal or UE and a base station or eNB.

FIG. 9 illustrates a block diagram of an embodiment of a base station 910 (e.g., an eNB or HeNB) and a terminal 950 (i.e., a terminal, AT or UE) in an example LTE communication system 900, which may be configured to provide ECN functionality as described herein. These components may correspond to those shown in FIGS. 1-4 and 6, and may be configured to implement all or part of the processing illustrated subsequently herein in FIGS. 10-13.

Various functions may be performed in the processors and memories as shown in base station 910 (and/or in other components not shown), such as sending and receiving ECN messaging, as well as other functions as described previously herein. UE 950 may include one or more modules to receive signals from base station 910 to, for example, send and receive ECN messaging and/or adjust operation in accordance with the various ECN-related functions described herein, including rate adaptation.

In one embodiment, base station 910 may adjust output transmissions in response to information received from UE 950 or from backhaul signaling from another base station or a core network (not shown in FIG. 9) as described previously herein. This may be done in one or more components (or other components not shown) of base station 910, such as processors 914, 930 and memory 932. Base station 910 may also include a transmit module including one or more components (or other components not shown) of eNB 910, such as transmit modules 924. Base station 910 may include an interference cancellation module including one or more components (or other components not shown), such as processors 930, 942, demodulator module 940, and memory 932 to provide interference cancellation functionality. Base station 910 may include a subframe partition coordination module including one or more components (or other components not shown), such as processors 930, 914 and memory 932 to perform subframe partition functions as described previously herein and/or manage the transmitter module based on the subframe partition information. Base station 910 may also include a control module for controlling receiver functionality. Base station 910 may include a network connection module 990 to provide networking with other systems, such as backhaul systems in the core network or other components as shown in FIGS. 3 and 4.

Likewise, UE 950 may include a receive module including one or more components of UE 950 (or other components not shown), such as receivers 954. UE 950 may also include a signal information module including one or more components (or other components not shown) of UE 950, such as processors 960 and 970, and memory 972. In one embodiment, one or more signals received at UE 950 are processed to estimate channel characteristics, power information, spatial information and/or other information regarding eNBs, such as base station 910 and/or other base stations (not shown). Measurements may be performed during semi-static subframes that are noticed to UE 950 by base station 910. Memories 932 and 972 may be used to store computer code for execution on one or more processors, such as processors 960, 970 and 938, to implement processes associated with channel measurement and information, power level and/or spatial information determination, cell ID selection, inter-cell coordination, interference cancellation control, as well as other functions related to subframe allocation, interlacing, and associated transmission and reception as are described herein.

In operation, at the base station 910, traffic data for a number of data streams may be provided from a data source 912 to a transmit (TX) data processor 914, where it may be processed and transmitted to one or more UEs 950. The transmitted data may be controlled as described previously herein so as to provide interlaced subframe transmissions and/or perform associated signal measurements at one or more UEs 950.

In one aspect, each data stream is processed and transmitted over a respective transmitter sub-system (shown as transmitters 924$_1$-924$_{Nt}$) of base station 910. TX data processor 914 receives, formats, codes, and interleaves the traffic data for each data stream based on a particular coding scheme selected for that data stream so as to provide coded data. In particular, base station 910 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 914 as shown in FIG. 9 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 930 based on instructions stored in memory 932, or in other memory or instruction storage media of UE 950 (not shown).

The modulation symbols for all data streams may then be provided to a TX MIMO processor 920, which may further process the modulation symbols (e.g., for OFDM implementation). TX MIMO processor 920 may then provide Nt modulation symbol streams to $N_t$ transmitters (TMTR) 922$_1$ through 922$_{Nt}$. The various symbols may be mapped to associated RBs for transmission.

TX MIMO processor 930 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . b$_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1$x$1+B2$x$2+BN$_S$xN$_S$, where N$_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system 922$_1$ through 922$_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters 922$_1$ through 922$_{Nt}$ are then transmitted from $N_t$ antennas 924$_1$ through 924$_{Nt}$, respectively.

At UE 950, the transmitted modulated signals are received by $N_r$ antennas 952$_1$ through 952$_{Nr}$, and the received signal from each antenna 952 is provided to a respective receiver (RCVR) 954$_1$ through 952$_{Nr}$. Each receiver 954 conditions (e.g., filters, amplifies and downconverts) a respective received signal, digitizes the conditioned signal to provide samples, and further processes the samples to provide a corresponding "received" symbol stream.

An RX data processor 960 then receives and processes the $N_r$ received symbol streams from $N_r$ receivers 954$_1$ through 952$_{Nr}$ based on a particular receiver processing technique so as to provide N$_S$ "detected" symbol streams so at to provide estimates of the N$_S$ transmitted symbol streams. The RX data processor 960 then demodulates, deinterleaves, and decodes each detected symbol stream to recover the traffic data for the data stream. The processing by RX data processor 960 is typically complementary to that performed by TX MIMO processor 920 and TX data processor 914 in base station 910.

A processor 970 may periodically determine a precoding matrix for use as is described further below. Processor 970 may then formulate a reverse link message that may include a matrix index portion and a rank value portion. In various aspects, the reverse link message may include various types of information regarding the communication link and/or the received data stream. The reverse link message may then be processed by a TX data processor 938, which may also receive traffic data for a number of data streams from a data source 936 which may then be modulated by a modulator 980, conditioned by transmitters 954₁ through 954_{Nr}, and transmitted back to base station 910. Information transmitted back to base station 910 may include power level and/or spatial information for providing beamforming to mitigate interference from base station 910.

At base station 910, the modulated signals from UE 950 are received by antennas 924, conditioned by receivers 922, demodulated by a demodulator 940, and processed by a RX data processor 942 to extract the message transmitted by UE 950. Processor 930 then determines which pre-coding matrix to use for determining beamforming weights, and then processes the extracted message.

Figure 10:
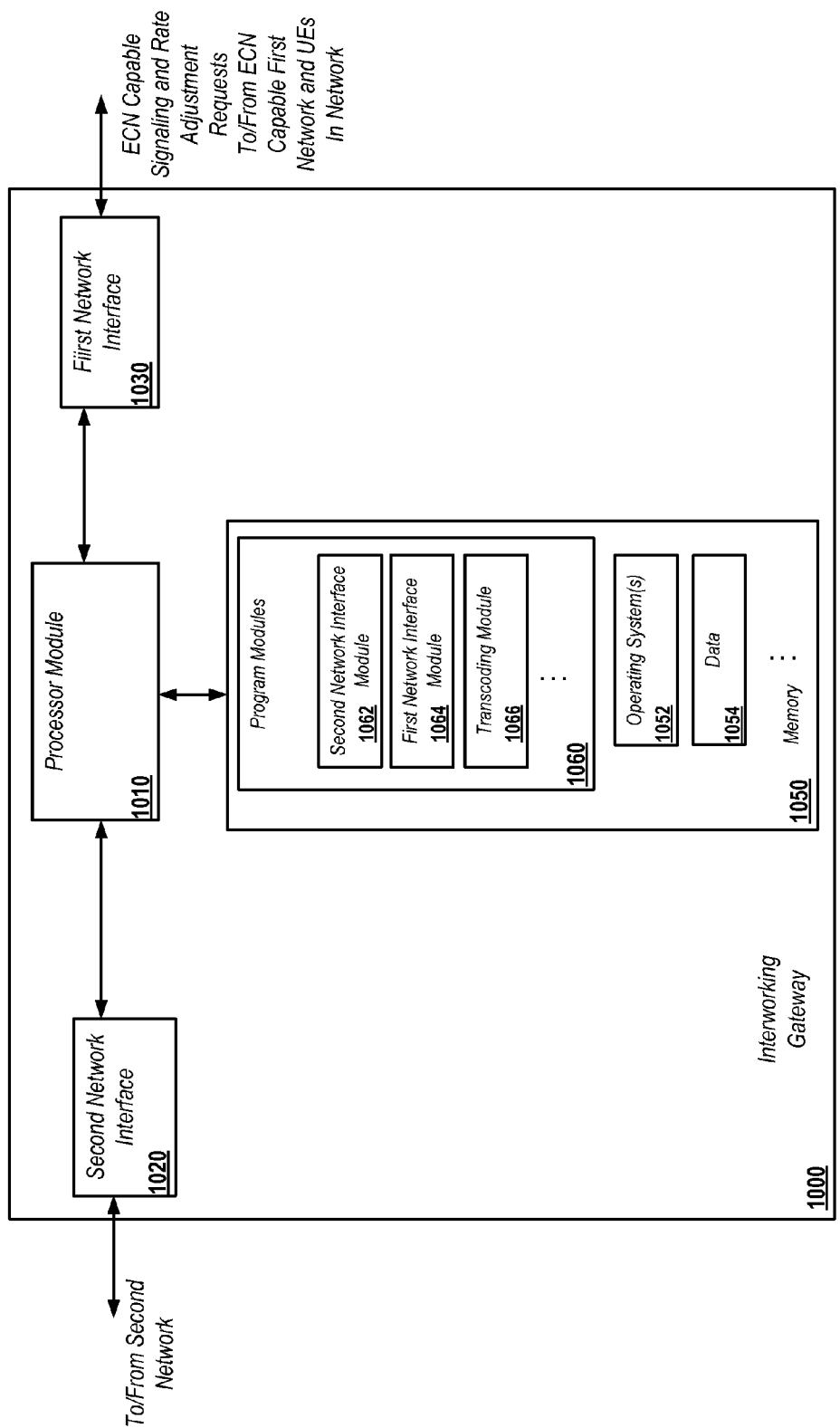
FIG. 10 illustrates details of an embodiment of an interworking gateway.

FIG. 10 illustrates details of an example interworking gateway 1000, which may correspond to gateways 640 or 740 as shown in FIGS. 6 and 7. Gateway 1000 may include one or more first network interfaces 1030 to facilitate communication of data and media between the gateway and an associated first network, which may correspond with network 630 or network 730. In some cases, the interworking gateway and associated functionality may be incorporated, in whole or in part, with the core network or with other nodes of the first network.

The data may include data consistent with ECN functionality so that nodes, such as terminals or UEs in the first network, may function in accordance with an ECN protocol. In addition, gateway 1000 may include one or more second network interfaces 1020 to facilitate interfacing between the gateway and one or more other networks, which may correspond to networks 650 or 750 as shown in FIGS. 6 and 7. In addition, gateway 1000 may include one or more processor modules configured to execute instructions that may be stored in one or more program modules 1060. Program modules 1060 may be stored in a memory space 1050, that may include one or more physical memories or other data storage devices. In addition, memory 1050 may include other data or information, such as an operating system module 1052, operational or message data 1054, and/or other data or information.

Program modules may include a first network interface module 1064 configured to facilitate ECN processing between the gateway and local UEs, such as to process congestion indications and generate rate adjustment messaging, a second network interface module 1062, which may be configured to facilitate ECN processing between the gateway and external networks, such as to respond to requests for rate adaptation, adjust ECN packets to a non-ECN network format (for example, by stripping ECN bits such as ECT or CE bits), and/or perform other processing as described herein. In addition, program modules 1060 may include a transcoding module 1066 to transcode data between two or more networks as well as other modules to perform interworking processing and functionality as described herein (not shown in FIG. 10).

Figure 11:
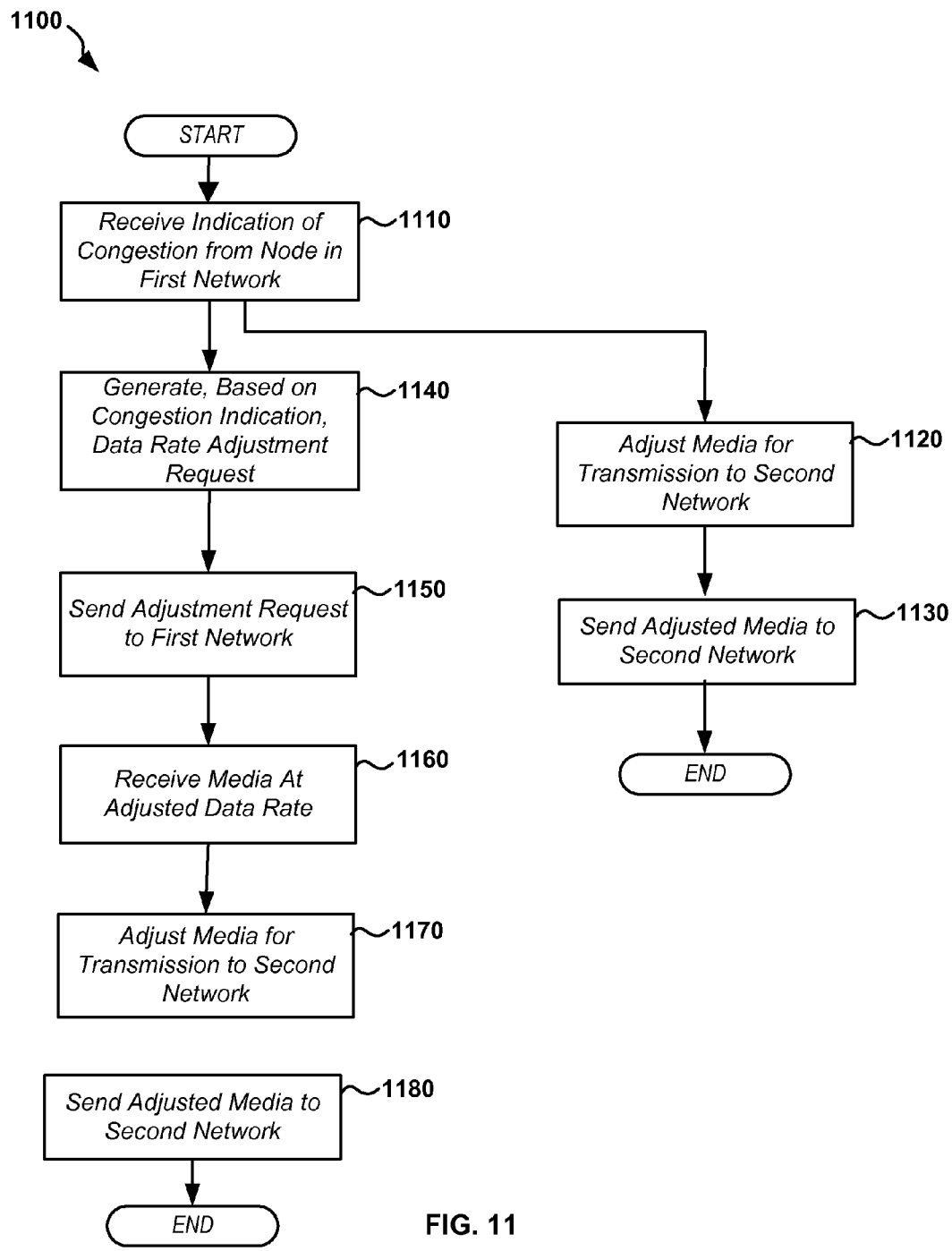
FIG. 11 illustrates details of an embodiment of a process for facilitating ECN transparent communications between networks.

FIG. 11 illustrates an embodiment of a process 1100 for providing communications using interworking functionality. At stage 1110, an indication of congestion may be received at, for example, an interworking gateway, such as, for example, is shown in FIGS. 6 and 7. The indication may be provided from a node in a first network, where the first network may be, for example, an ECN capable network. The indication may be an indication using ECNcongestion messaging, such as a CE indication in a data packet associated with media being sent to another network node such as a second UE in a second network.

For example, a first UE in the first network, such as, for example, UE 610 of FIG. 6, which may be ECN capable, may send media to a second UE in a second network, such as, for example, UE 670, which is not ECN capable. The message may be sent through intermediate nodes such as routers, switches, and/or other nodes of the first network, where congestion may be encountered. In this case, packets may be marked by the intermediate nodes with, for example, CE bits set in accordance with an ECN protocol, indicating potential congestion. Upon receipt at the interworking gateway, the packets may be processed to facilitate interworking with the second network so as to make the second network appear ECN transparent to the first network node, or to make the interworking gateway function act as a termination point for the congestion indication messaging from the first network while maintaining ECN functionality.

For example, at stage 1120, the media may be adjusted for transmission to the second network at the interworking gateway so as to be in a non-ECN capable format. This may be done by, for example, removing any ECN bits set in packets (e.g., stripping ECT bits, the CE bits, and the like). The adjusted message may then be sent to the second network at stage 1130. In some implementations, the media adjustment stage 1120 may be omitted and the media may be send unadjusted to the second network.

In addition, a data rate adjustment request may be generated at stage 1140. This may be done to indicate to the first UE that congestion was encountered in the first network and a lower data rate may be desirable to mitigate the congestion and avoid potential packet loss. The adjustment request may then be sent to the UE and/or to intermediate nodes, such as, for example, a serving base station such as base station 612 as shown in FIG. 6. In some cases, data rate adjustment may be done in conjunction with another node, such as base station 612, however, in general, the first UE will respond directly to the data rate adjustment request. For example, the UE may adjust the data rate of media to be provided to the second UE, which will typically be an adjustment to a lower data rate. In some cases, the UE and/or other nodes, such as serving base stations, may decide not to adjust the data rate.

At stage 1160, media at the adjusted rate sent by the first UE may be received at the interworking gateway. Similar to stage 1120, the media may be adjusted to a non-ECN capable format for transmission to the second network. For example, ECN bits may be stripped from packets before forwarding to the second network. In some cases, no adjustment may be done. Either way, the media may then be forwarded to the second network, where it may ultimately be delivered to the second UE.

Figure 12:
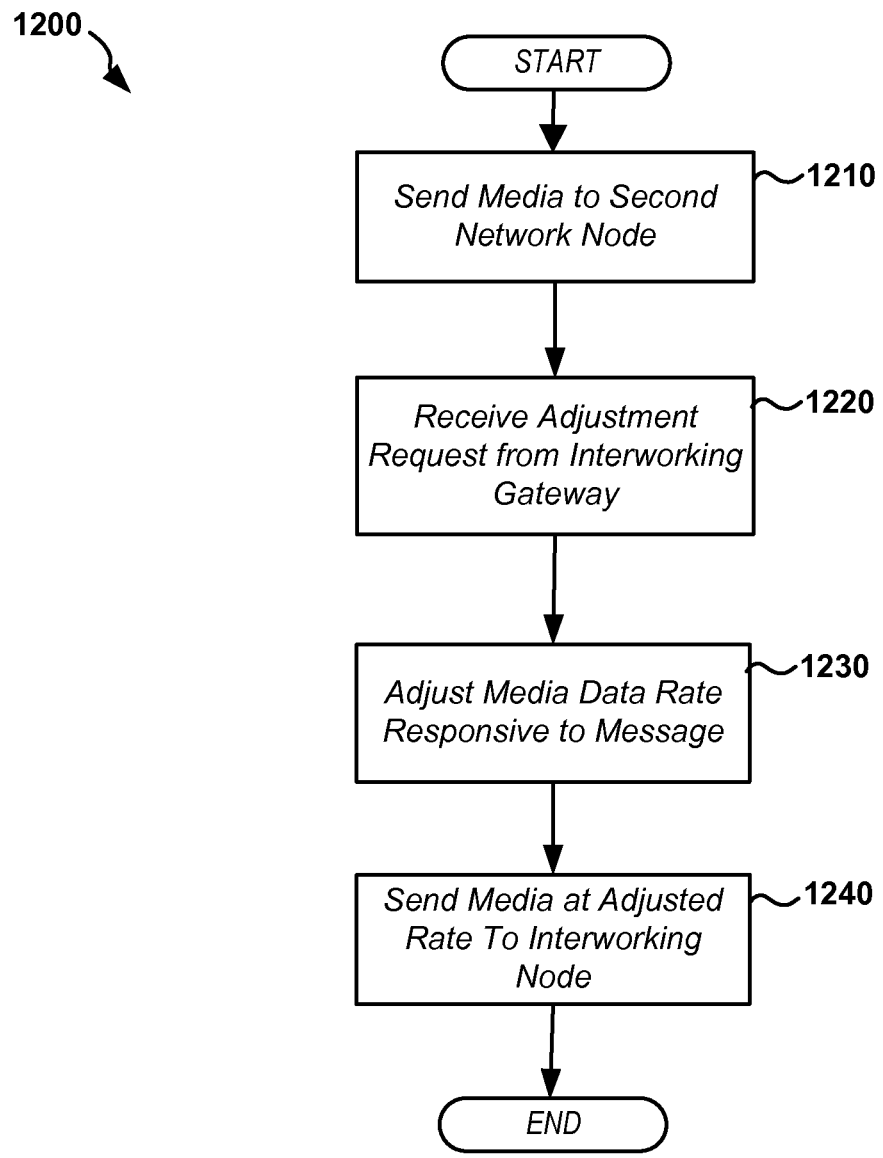
FIG. 12 illustrates details of an embodiment of a process for facilitating ECN transparent communications between networks.

FIG. 12 illustrates an embodiment of a process 1200 for providing communications using interworking functionality. Process 1200 may be implemented, for example, by a first network UE in conjunction with functionality provided by an interworking gateway, such as, for example, is illustrated in FIG. 11. At stage 1210, a first network node, such as a ECN capable UE operating in an ECN capable network, may send media to a node in a second network, such as a second UE in the second network, which may be a non-ECN capable network. The first and second UEs may be in communication, such as shown in FIGS. 6 and 7. The media sent at stage 1210 may be subject to congestion in the first network, where, for example, a congestion indication, such as setting of CE bits in packets, may be done by intermediate nodes. Upon receipt at an interworking gateway, a media data rate reduction request may be generated and sent, where it may then be received by the first UE at stage 1220. The UE may then adjust the data rate in response to the adjustment request at state 1230, typically to a lower data rate to mitigation congestion in the first network. In some cases, the UE and/or other intermediate nodes, such as a serving base station, may choose to not adjust the data rate.

At stage 1240, media at the adjusted rate may then be sent to the interworking node for further transmission to the second network and second UE. The media may be processed by the interworking gateway, such as, for example, as illustrated in FIG. 11, before being further transmitted to the second network and second UE.

Figure 13:
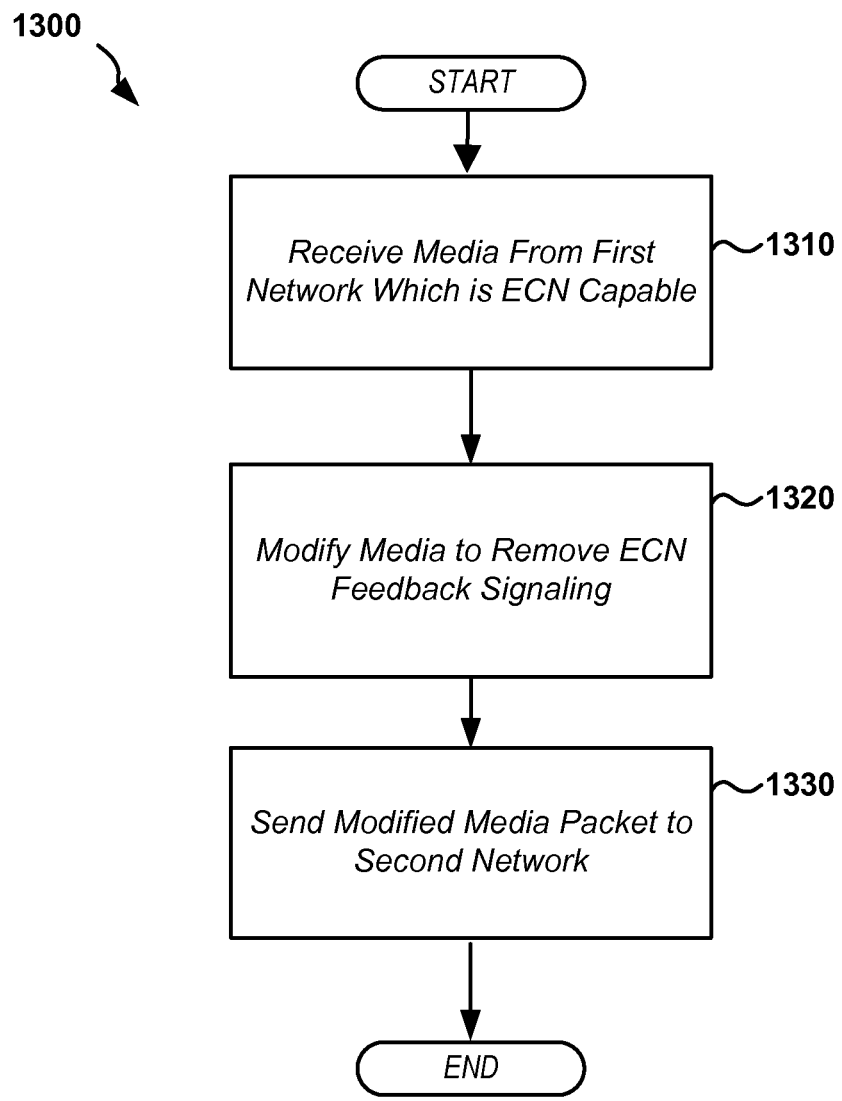
FIG. 13 illustrates details of an embodiment of a process for facilitating ECN transparent communications between networks.

FIG. 13 illustrates an embodiment of a process 1300 for providing communications using interworking functionality. At stage 1310, media, which may be, for example, voice or audio content, video content, images or other content, may be received, such as at an interworking gateway. The media may be provided from a node in a first network, such as a terminal or UE, that may be ECN capable. The media may be marked by an intermediate node in the first network, such as, for example, a router or switch, where the marking may provide a congestion indication. For example, a CE flag or bits may be set in media packets.

At stage 1320, the media may be modified to remove ECN feedback signaling or marking, such as, for example, by removing the CE flag or bits from the packets. The media may then be sent at stage 1330 to a second network and associated second network node in a non-ECN format. For example, the second network may be non-ECN capable, with the media modified accordingly. The media may be modified by, for example, removing ECN signaling such as ECT or CE bits or flags.

Figure 14:
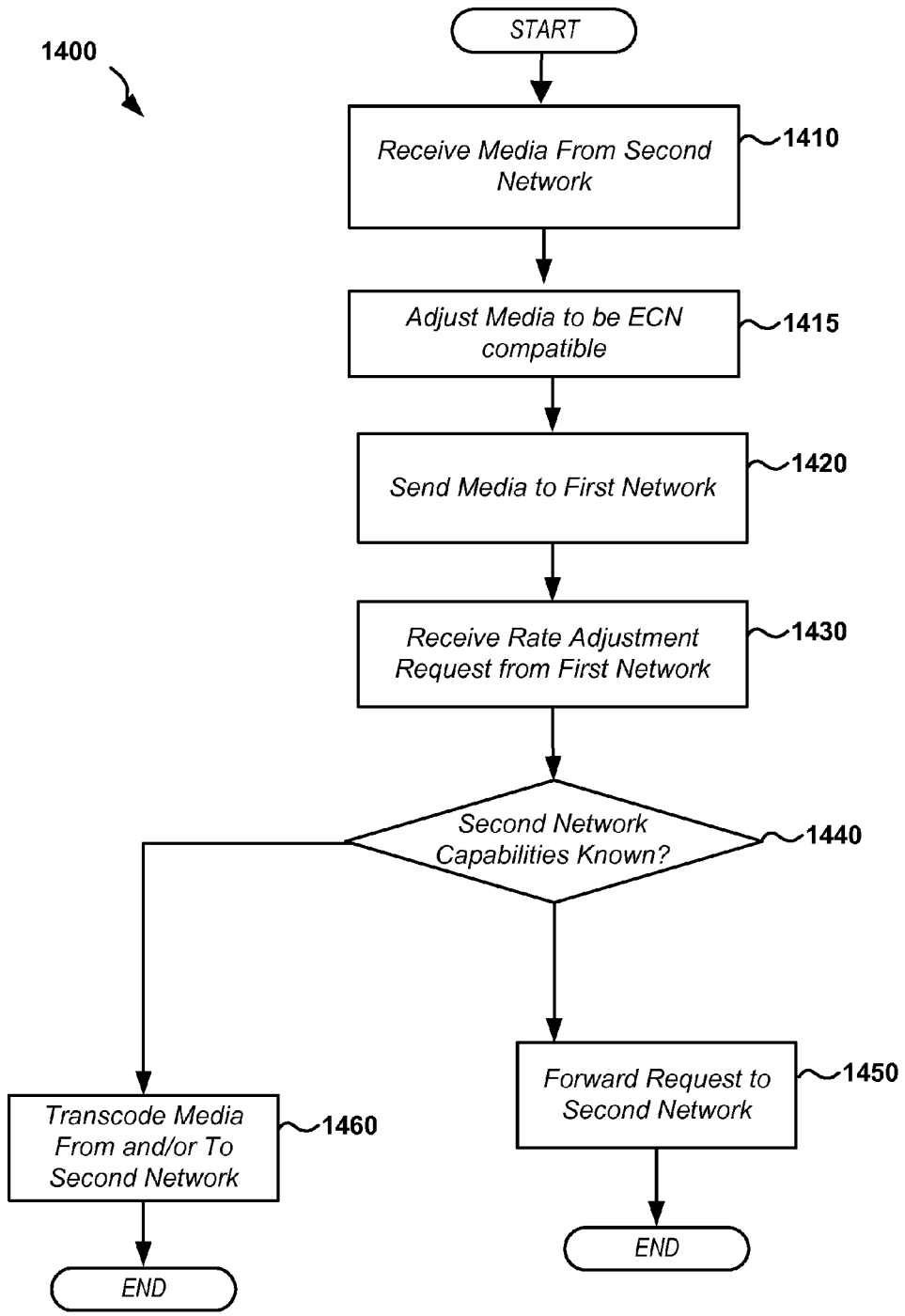
FIG. 14 illustrates details of an embodiment of a process for facilitating ECN transparent communications between networks.

FIG. 14 illustrates an embodiment of a process 1400 for providing communications using interworking functionality. At stage 1410, media may be received from a second network. For example, the media may be provided from a UE in the second network, which may be non-ECN capable, and received at an interworking gateway, such as, for example, are shown in FIGS. 6 and 7. The media may then be forwarded to a first network at stage 1420. For example, the media may be provided to a first UE in the first network, which may be ECN capable. In addition, the internetworking gateway may adjust the media at stage 1415 to be ECN compatible to support ECN functionality, such as, for example, by adding ECT markings to the media. This may allow nodes within the first network to set CE bits if congestion is encountered between the interworking gateway and the first UE.

For example, the first UE may correspond to UEs 610 or 710 of FIGS. 6 and 7, respectively. The media may be marked during transmission through intermediate nodes of the first network with an ECN indication, such as, for example, CE marking. The first UE may then send, based on the congestion indication, a rate reduction request, where the rate reduction request may be targeted to the UE in the second network (designated as a second UE). The interworking gateway may receive the rate adjustment request from the first network at stage 1430. In response to the rate adjustment request, the interworking gateway may process the request so as to provide integration of ECN functionality between the first and second networks. For example, this may be done by providing a decision of second network capability 1440 may be made at the interworking gateway as to how to further process the request to maintain ECN functionality. For example, the interworking gateway may know, or may be able to determine, whether the second UE can accommodate the rate reduction request. This may be done by, for example, negotiation, which may be defined for certain types of media, such as video. If the gateway knows or can determine that the second UE can accommodate the request, it may then forward the request at stage 1450 to the second network, where it may then be sent to the second UE, such as, for example, is shown in FIGS. 6 and 7, where UE 670 or 770 may correspond to the second UE. If the gateway does not know or is unable to determine whether the UE can accommodate the request, it may then process incoming messages from the second UE to avoid congestion in the first network. For example, at stage 1460, the interworking gateway may transcode media from the second network to mitigate congestion. This may be done by, for example, transcoding the media to a lower data rate so that the amount of data is reduced in the first network. In some cases, media provided from the first network may also be transcoded by, for example, the interworking gateway to accommodate data rates expected by devices in the second network.

In some configurations, the apparatus for wireless communication includes means for performing various functions as described herein. In one aspect, the aforementioned means may be a processor or processors and associated memory in which embodiments reside, such as are shown in FIGS. 8 through 10, and which are configured to perform the functions recited by the aforementioned means. The may be, for example, modules or apparatus residing in UEs, eNBs, interworking gateways or other network nodes such as are shown in FIGS. 1-4, and 6-10 to provide ECN related functions described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

The invention claimed is:

1. A method for providing communications, comprising:
    receiving, at an interworking gateway coupled between a first network and a second network, a first set of media generated at a first data rate, wherein the first set of media includes a first indication of network congestion generated within the first network;
    providing, based on the first indication of network congestion, a data rate adjustment request for requesting a lower data rate from a first user equipment (UE) in the first network;
    modifying the first set of media to remove the first indication of network congestion; and
    sending the modified first set of media to the second network.

2. The method of claim 1, further including:
    receiving, at the interworking gateway, a second set of media having a second indication of network congestion generated within the first network sent from the first UE at a second data rate responsive to the data rate adjustment request; and
    sending, from the interworking gateway to the second network, the second set of media.

3. The method of claim 2, wherein the first set of media and the second set of media are generated by the first UE in the first network for transmission to a second UE in the second network.

4. The method of claim 2, wherein the second set of media is modified to remove the second indication of network congestion, and the sending comprises sending the modified media.

5. The method of claim 1, wherein the first indication of network congestion comprises a first explicit congestion notification congestion encountered (ECN-CE) marking and the second indication of network congestion comprises a second ECN-CE marking.

6. The method of claim 1, wherein the first network is an explicit congestion notification (ECN) capable network and the second network is a non-ECN capable network.

7. The method of claim 1, wherein the data rate adjustment request comprises a temporary maximum media bitrate request (TMMBR).

8. The method of claim 1, wherein the first network and the second network are wireless communication networks.

9. A computer program product comprising a non-transitory computer-readable medium including codes for causing a computer to:
    receive a first set of media generated at a first data rate, wherein the first set of media includes a first indication of network congestion generated within the first network;
    provide, based on the first indication, a data rate adjustment request for requesting a lower data rate from a first UE in a first network;
    modify the first set of media to remove the first indication of network congestion; and
    send the modified first set of media to the second network.

10. The computer program product of claim 9, wherein the codes further include codes for causing the computer to receive a second set of media having a second indication of network congestion generated within the first network sent from the first UE at a second data rate responsive to the data rate adjustment request, and send to a second network, the second set of media.

11. The computer program product of claim 10, wherein the first set of media and the second set of media are generated by the first UE in the first network for transmission to a second UE in the second network.

12. The computer program product of claim 10, wherein the second set of media is modified to remove the second indication of network congestion, and the sending comprises sending the modified media.

13. The computer program product of claim 9, wherein the first indication of network congestion comprises a first explicit congestion notification congestion encountered (ECN-CE) marking and the second indication of network congestion comprises a second ENC-CE marking.

14. The computer program product of claim 9, wherein the first network is an explicit congestion notification (ECN capable network and the second network is a non-ECN capable network.

15. The computer program product of claim 9, wherein the data rate adjustment request comprises a temporary maximum media bitrate request (TMMBR).

16. An interworking gateway, comprising:
a first network interface module configured to receiving a first set of media generated at a first data rate from a first network, wherein the first set of media includes a first indication of network congestion generated within the first network;
a processor module configured to:
generate, based on the first indication, a data rate adjustment request; and
modify the first set of media to remove the first indication of network congestion, wherein the first network interface module is further configured to provide the data rate adjustment request to a first UE in the first network; and
a second network interface module configured to send the modified first set of media to the second network.

17. The gateway of claim 16, wherein the first network interface module is further configured to receive a second set of media having a second indication of network congestion generated within the first network sent from the first UE at a second data rate responsive to the data rate adjustment request, and wherein the gateway further includes a second network interface module configured to send, to a second network, the second set of media.

18. The gateway of claim 17, wherein the first set of media and the second set of media are generated by the first UE in the first network for transmission to a second UE in the second network.

19. The gateway of claim 17, wherein the processor module is further configured to remove the second indication of network congestion, and wherein the sending comprises sending the modified media.

20. The gateway of claim 16, wherein the first indication of network congestion comprises a first explicit congestion notification congestion encountered (ECN-CE) marking and the second indication of network congestion comprises a second ECN-CE marking.

21. The gateway of claim 16, wherein the first network is an explicit congestion notification (ECN) capable network and the second network is a non-ECN capable network.

22. The gateway of claim 16, wherein the processor module is configured to generate the data rate adjustment request as a temporary maximum media bitrate request (TMMBR).

23. The gateway of claim 16, wherein the first network and the second network are wireless communication networks.

24. An interworking gateway, comprising:
means for receiving a first set of media generated at a first data rate, wherein the first set of media includes a first indication of network congestion generated within the first network;
means for providing based on the first indication, a data rate adjustment request for requesting a lower data rate from a first UE in the first network;
means for modifying the first set of media to remove the first indication of network congestion; and
means for sending the modified first set of media to the second network.

25. The gateway of claim 24, further comprising
means for receiving a second set of media having a second indication of network congestion generated within the first network sent from the first UE at a second data rate responsive to the data rate adjustment request; and
means for sending, to a second network, the second set of media.

26. The gateway of claim 25, wherein the first network and the second network are wireless communication networks.

27. The gateway of claim 25, wherein the first network is an explicit congestion notification (ECN) capable network and the second network is a non-ECN capable network.

* * * * *